United States Patent
Nagao

(10) Patent No.: US 10,042,345 B2
(45) Date of Patent: Aug. 7, 2018

(54) CONVERSION DEVICE, PATTERN RECOGNITION SYSTEM, CONVERSION METHOD, AND COMPUTER PROGRAM PRODUCT

(71) Applicant: KABUSHIKI KAISHA TOSHIBA, Minato-ku, Tokyo (JP)

(72) Inventor: Manabu Nagao, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 376 days.

(21) Appl. No.: 14/608,334

(22) Filed: Jan. 29, 2015

(65) Prior Publication Data

US 2015/0220074 A1 Aug. 6, 2015

(30) Foreign Application Priority Data

Jan. 31, 2014 (JP) .................................. 2014-017494

(51) Int. Cl.
*G05B 19/045* (2006.01)
*G05B 15/02* (2006.01)

(52) U.S. Cl.
CPC .. *G05B 19/045* (2013.01); *G05B 2219/23288* (2013.01)

(58) Field of Classification Search
CPC ........ G05B 19/045; G05B 2219/23288; G06F 17/28; G06F 17/2775

(Continued)

(56) References Cited

U.S. PATENT DOCUMENTS 6,243,679 B1 * 6/2001 Mohri ................... G10L 15/193
704/10
6,456,971 B1 9/2002 Mohri et al.
(Continued)

FOREIGN PATENT DOCUMENTS

JP 2004-054298 2/2004
JP 2009-058989 3/2009
(Continued)

OTHER PUBLICATIONS

Mangu, et al., Finding Consensus in Speech Recognition: Word Error Minimization and Other Applications of Confusion Networks, Computer Speech and Language 14.4, Oct. 7, 2000, pp. 373-400 (IFW copy retrieved from: https://arxiv.org/pdf/cs/0010012.pdf Jan. 18, 2017).*

(Continued)

*Primary Examiner* — Mohammad Ali
*Assistant Examiner* — Joshua Sanders
(74) *Attorney, Agent, or Firm* — Amin, Turocy & Watson LLP

(57) ABSTRACT

According to an embodiment, a conversion device converts a first automaton into a second automaton, which both are weighted finite state automatons. The first automaton has a boundary of a path assigned with an input symbol, an appearance position of the boundary, and identifiers for identifying paths. The second automaton has path(s) except unnecessary path(s). The device includes a specifying unit and a search unit. The specifying unit is configured to specify, as a start position, a state of the head of a retrieved path in which a combined weight, which is obtained by adding an accumulated weight from an initial state to the state of the head of the retrieved path in the first automaton and a weight of the best path from the state of the head of the retrieved path to a final state, is best. The search unit is (Continued)

configured to search for a path in which a weight from the start position to a final state in the first automaton is best until reaching next boundary.

13 Claims, 8 Drawing Sheets

(58) Field of Classification Search
USPC .......................................................... 700/87
See application file for complete search history.

(56) References Cited

U.S. PATENT DOCUMENTS

| | | | |
|---|---|---|---|
| 7,003,740 B2 | 2/2006 | Gunawardana | |
| 7,050,975 B2 | 5/2006 | Deng et al. | |
| 7,181,386 B2 * | 2/2007 | Mohri | G06F 17/27 704/1 |
| 7,565,380 B1 * | 7/2009 | Venkatachary | G06F 7/02 707/200 |
| 7,571,098 B1 * | 8/2009 | Gorin | G06F 17/2775 704/236 |
| 7,711,561 B2 | 5/2010 | Hogenhout et al. | |
| 7,895,040 B2 | 2/2011 | Sakai et al. | |
| 8,275,730 B2 | 9/2012 | Nagao | |
| 8,311,825 B2 | 11/2012 | Chen | |
| 8,744,836 B2 | 6/2014 | Nagao | |
| 2013/0073503 A1 | 3/2013 | Nagao | |
| 2013/0073564 A1 | 3/2013 | Nagao | |
| 2013/0179158 A1 | 7/2013 | Nakamura et al. | |

FOREIGN PATENT DOCUMENTS

| | | |
|---|---|---|
| JP | 4241771 | 3/2009 |
| JP | 4322815 | 9/2009 |
| JP | 2011-198126 | 10/2011 |
| JP | 2012-113087 | 6/2012 |
| JP | 4956334 | 6/2012 |
| JP | 4977163 | 7/2012 |
| JP | 5121650 | 1/2013 |
| JP | 2013-065188 | 4/2013 |
| JP | 2013-164572 | 8/2013 |

OTHER PUBLICATIONS

Ljolje, et al., Efficient General Lattic Generation and Rescoring, Eurospeech. 1999. (IFW copy retreived from: https://pdfs.semanticscholar.org/baae/4f08fa50ead7f13df8003ec6fa2db8d65106.pdf Jan. 18, 2017).*

Nakagawa, et al., A Robust/Fast Spoken Term Detection Method Based on a Syllable N-Gram Index With a Distance Metric, Speech Communication vol. 55-3, Mar. 2013, pp. 470-485 (IFW copy retreived from: http://www.sciencedirect.com/science/article/pii/S0167639312001392 Jan. 18, 2017).*

Revuz, Dominique. "Minimisation of acyclic deterministic automata in linear time." Theoretical Computer Science 92.1 (1992): 181-189., retreived from http://www.sciencedirect.com/science/article/pii/0304397592901423 on Aug. 1, 2017.*

D. Povey, et al. "Generating exact lattices in the WFST framework," in Proceedings of the International Conference on Acoustics, Speech, and Signal Processing (ICASSP '12), pp. 4213-4216, 2012.

Y. Guo, et al. "Lattice generation with accurate word boundary in WFST framework," 5th International Congress on Image and Signal Processing (CISP), 2012, pp. 1592-1595.

A. Serralheiro, et al. "Towards a repository of digital talking books," in Proceedings of the Eurospeech 2003, pp. 1605-1608, Geneva, Switzerland, Sep. 2003.

P. R. Dixon, et al. "An investigation into lattices generated from WFST based decoders," The 2013 Spring Meeting of the Acoustical Society of Japan, vol. 2-9-1, pp. 35-36, 2013.

D. Nolden, et al. "Removing redundancy from lattices," in Proceedings of the Interspeech 2014, pp. 656-660, Singapore, Sep. 2014.

A. Ljolje, et al. "Efficient general lattice generation and rescoring," in Proceedings of the Sixth European Conference on Speech Communication and Technology (Eurospeech 1999), pp. 1251-1254, 1999.

* cited by examiner

```
search_symbol(S_sym, M, q_i, q_pi, w_i, x_i)
1   B ← ∅, P ← ∅
2   {q'_i} ← {q' | (q_i, q', ·) ∈ M}
3   S ← {(q_i, q_pi, w_i, 0, x_i, ε, false)}
4   while S ≠ ∅
5       (q, q_p, w, w_p, x, x_p, b) ← pop(S)
6       if q ∉ P
7           P ← P ∪ {q}
8           if q ∈ F
9               if (q, ·, ·) ∈ M
10                  {q'_n} ← {q' | (q, q', ·) ∈ M}
11              else
12                  q'_n ← create a new state not in Q'
13                  t(q'_n) ← t(q)
14                  Q' ← Q' ∪ {q'_n}, F' ← F' ∪ {q'_n}, M ← M ∪ {(q, q'_n, 0)}
15                  E' ← E' ∪ {(q'_i, q'_n, x, w)}
16          else if b = true
17              if id(q) ∉ B
18                  B ← B ∪ {id(q)}
19                  if (q, ·, ·) ∈ M
20                      {(q'_n, w_m)} ← {(q', w_m) | (q, q', w_m) ∈ M}
21                      E' ← E' ∪ {(q'_i, q'_n, x, w − w_m)}
22                  else
23                      q'_n ← create a new state not in Q'
24                      t(q'_n) ← t(q_p)
25                      Q' ← Q' ∪ {q'_n}, M ← M ∪ {(q, q'_n, w_p)}
26                      E' ← E' ∪ {(q'_i, q'_n, x, w − w_p)}
27                  push(S_sym, (q, q_p, w, w_p, x_p))
28          else
29              foreach e ∈ E such that p(e) = q
30                  if n(e) ∉ P
31                      if b(e) = true
32                          push(S, (n(e), q, w + w(e), w(e), x, i(e), true))
33                      else
34                          push(S, (n(e), q, w + w(e), 0, x · i(e), ε, false))
35  return (S_sym, M)
```

400

```
remove_redundant_path
101   M ← ∅, S_sym ← ∅
102   foreach q ∈ I
103      q'_n ← create a new state not in Q'
104      t(q'_n) ← t(q)
105      Q' ← Q' ∪ {q'_n}, I' ← I' ∪ {q'_n}, M ← M ∪ {(q, q'_n, 0)}
106      push(S_sym, (q, q, 0, 0, ε))
107   while S_sym ≠ ∅
108      (q_i, q_pi, ·, w_i, x_i) ← pop(S_sym)
109      (S_sym, M) ← search_symbol(S_sym, M, q_i, q_pi, w_i, x_i)
```

```
search_symbol(S_sym, M, q_i, q_pi, w_i, x_i)
1    B ← ∅, P ← ∅
2    {q'_i} ← {q' | (q_i, q', ·) ∈ M}
3    S ← {(q_i, q_pi, w_i, 0, x_i, ε, false)}
4    while S ≠ ∅
5        (q, q_p, w, w_p, x, x_p, b) ← pop(S)
6        if (q, x · x_p) ∉ P
7            P ← P ∪ {(q, x · x_p)}
8            if q ∈ F
9                if (q, ·, ·) ∈ M
10                   {q'_n} ← {q' | (q, q', ·) ∈ M}
11               else
12                   q'_n ← create a new state not in Q'
13                   t(q'_n) ← t(q)
14                   Q' ← Q' ∪ {q'_n}, F' ← F' ∪ {q'_n}, M ← M ∪ {(q, q'_n, 0)}
15               E' ← E' ∪ {(q'_i, q'_n, x, w)}
16           else if b = true
17               if (id(q), x · x_p) ∉ B
18                   if (id(q), ·) ∉ B
19                       push(S_sym, (q, q_p, w, w_p, x_p))
20                   B ← B ∪ {(id(q), x · x_p)}
21                   if (q, ·, ·) ∈ M
22                       {(q'_n, w_m)} ← {(q', w_m) | (q, q', w_m) ∈ M}
23                       E' ← E' ∪ {(q'_i, q'_n, x, w − w_m)}
24                   else
25                       q'_n ← create a new state not in Q'
26                       t(q'_n) ← t(q_p)
27                       Q' ← Q' ∪ {q'_n}, M ← M ∪ {(q, q'_n, w_p)}
28                       E' ← E' ∪ {(q'_i, q'_n, x, w − w_p)}
29           else
30               foreach e ∈ E such that p(e) = q
31                   if (n(e), x · i(e)) ∉ P
32                       if b(e) = true
33                           push(S, (n(e), q, w + w(e), w(e), x, i(e), true))
34                       else
35                           push(S, (n(e), q, w + w(e), 0, x · i(e), ε, false))
36   return (S_sym, M)
```

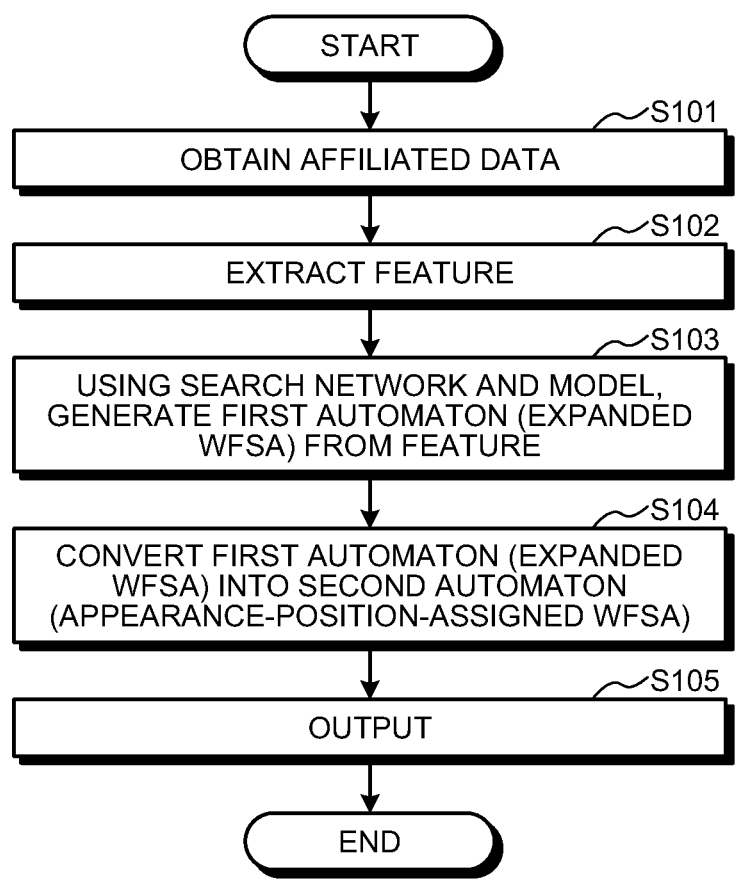

CONVERSION DEVICE, PATTERN RECOGNITION SYSTEM, CONVERSION METHOD, AND COMPUTER PROGRAM PRODUCT

CROSS-REFERENCE TO RELATED APPLICATION

This application is based upon and claims the benefit of priority from Japanese Patent Application No. 2014-017494, filed on Jan. 31, 2014; the entire contents of which are incorporated herein by reference.

FIELD

An embodiment described herein relates generally to a conversion device, a pattern recognition system, a conversion method, and a computer program product.

BACKGROUND

Finite state automatons (FSAs) are known. A FSA is sometimes called a finite automaton (FA) or a finite state machine (FSM). Moreover, a FSA in which transitions have weights assigned thereto is called a weighted finite state automaton (WFSA).

A pattern recognition device is known that performs pattern recognition with respect to sequential data, such as speech recognition, handwritten character recognition, or optical character recognition. As an example, the pattern recognition device outputs the single most probable recognition result or outputs N number of recognition results from the best recognition result to the N-th best recognition result corresponding to sequential data that has been input.

Meanwhile, there are also times when a pattern recognition device outputs a lattice as the recognition result. A lattice is a weighted digraph assigned with labels (input symbols) and appearance positions of the labels (input symbols). Thus, it can be said that a lattice is an appearance-position-assigned WFSA. Herein, an appearance position indicates the position of the sequential data, which is input to the pattern recognition device, corresponding to a label (an input symbol).

A lattice in which words represent the input symbols is generally called a word lattice. A lattice in which phonemes represent the input symbols is generally called a phoneme lattice. A lattice in which states of a hidden Markov model (HMM) represent the input symbols is generally called an HMM state lattice.

For example, in a pattern recognition device that performs pattern recognition with respect to speech data, sometimes an HMM is used as the model. Such a pattern recognition device records the sequence of states of the HMM, which have been passed during the recognition operation, in the form of a lattice; and outputs the recognition result in the form of an HMM state lattice in which the states of the HMM represent the input symbols.

Meanwhile, there are times when a pattern recognition device outputs a word-assigned HMM state lattice, in which the words represent the input symbols and the pairs of weights and HMM states represent the weights, in an appearance-position-assigned WFSA. In such an appearance-position-assigned WFSA, there exists a plurality of paths in which the same input symbol is assigned at the same appearance position, and there exist a number of empty transitions (ε transitions). Thus, at the subsequent stage of a pattern recognition device that outputs such an appearance-position-assigned WFSA, it is necessary to dispose a conversion device that eliminates elimination of unnecessary paths by executing a process of removing empty transitions (ε transitions) and a determinization process.

However, in such an appearance-position-assigned WFSA, even if the paths have the same appearance positions and are assigned with the same input symbols, there are times when those paths have different source states in the HMM. For example, even if the paths are assigned with the same input symbols, when the input symbols have different pronunciations, the source states in the HMM are different. However, in the conventional conversion device, such a plurality of paths is merged into a single path.

BRIEF DESCRIPTION OF THE DRAWINGS

FIG. 3 is a pseudo code for explaining an operation of searching for the best path;

FIG. 8 is a diagram illustrating a pseudo code according to a modification example;

FIG. 10 is a flowchart for explaining a sequence of processes performed in the pattern recognition system according to the embodiment.

DETAILED DESCRIPTION

Figure 1:
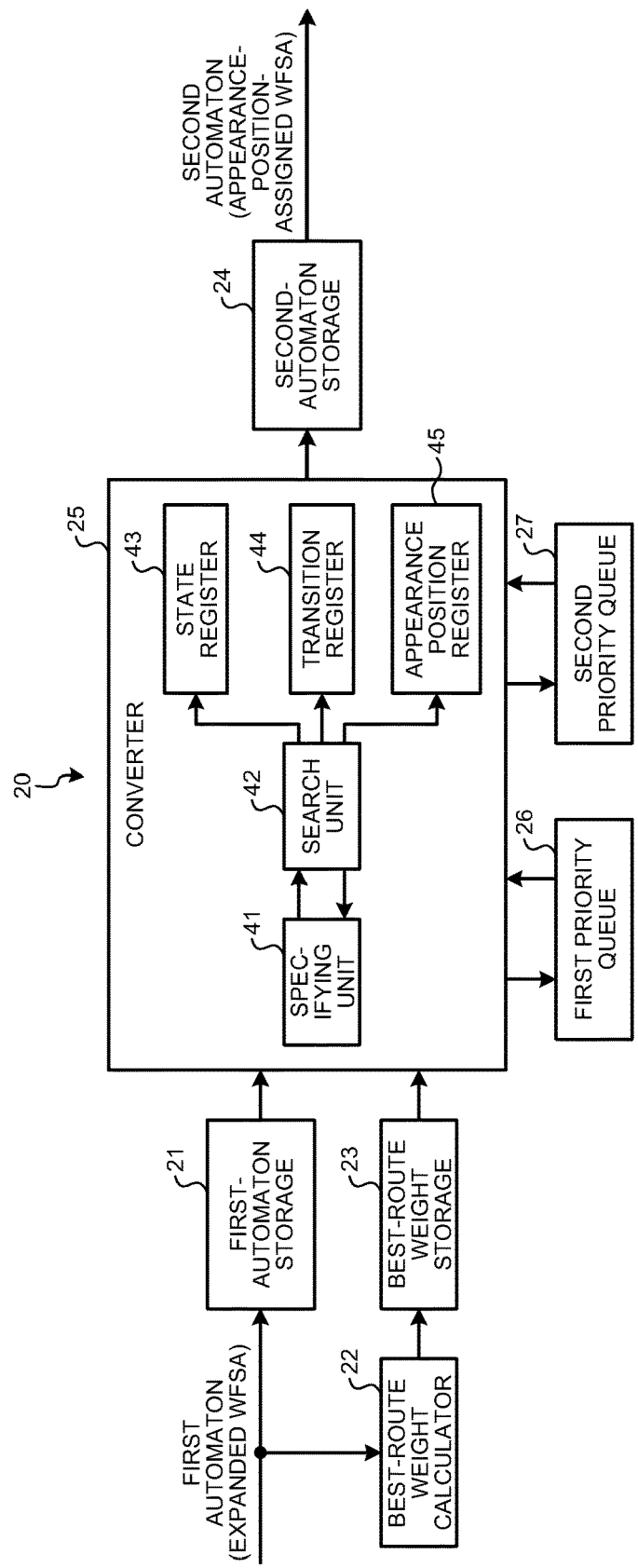
FIG. 1 is a configuration diagram of a conversion device according to an embodiment.

According to an embodiment, a conversion device converts a first automaton into a second automaton. The first automaton is a weighted finite state automaton in which a boundary of a path assigned with an input symbol, an appearance position of the boundary, and identifiers for identifying paths which can be merged together are assigned. The second automaton is a weighted finite state automaton having paths of the first automaton except at least one or more of unnecessary paths. The conversion device includes a specifying unit, a search unit, and a transition register. The specifying unit is configured to specify, as a start position, a state of the head of a retrieved path in which a combined weight, which is obtained by adding an accumulated weight from an initial state to the state of the head of the retrieved path in the first automaton and a weight of the best path from the state of the head of the retrieved path to a final state, is best. The search unit is configured to, for each of the identifiers, search for a path in which a weight from the start position to a final state in the first automaton is best until reaching next boundary. The transition register is configured to, when a search has reached next boundary from the start position, register, in the second automaton, a new transition corresponding to a start position and a state of the head in a path retrieved as a result of the search.

Premise

Firstly, the explanation is given about the technology and the definitions serving as the premise of an embodiment.

In a weighted finite state automaton (WFSA), a transition has an input symbol and a weight assigned thereto. A WFSA is configured as a 8-tuple $(Q, E, \Sigma, K, I, F, \lambda, \rho)$ including a set $Q$ of states, a set $E$ of transitions, a set $\Sigma$ of input symbols, a set $\Gamma$ of output symbols, a set $K$ of weights, a set $I$ of initial states, a set $F$ of final states, an initial weight function $\lambda$, and a final weight function $\rho$. Moreover, a transition is configured as a 4-tuple (previous state, next state, input symbol, weight).

In the embodiment, it is possible to assign $\varepsilon$ to a transition instead of a symbol included in the set $\Sigma$ of input symbols. Herein, $\varepsilon$ indicates that the symbol is empty. Moreover, it is assumed that the empty input symbol $\varepsilon$ is not included in the set $\Sigma$ of input symbols. A transition for which the resultant input symbol of transition is the empty input symbol $\varepsilon$, that is, a transition for which the empty symbol $\varepsilon$ is assigned as the input symbol is called an empty transition or an $\varepsilon$ transition in the embodiment.

An input symbol string represents a symbol string in which zero or more input symbols assigned to a WFSA are concatenated. Herein, an input symbol string having zero input symbols indicates an empty symbol string in which not a single symbol is yet concatenated.

In the embodiment, regarding a transition e; the previous state is expressed as $p(e)$, the next state is expressed as $n(e)$, the input symbol is expressed as $i(e)$, and the weight is expressed as $w(e)$. Moreover, in the embodiment, an empty set is expressed as $\{\ \}$. In a pseudo code described later, an empty set is expressed by superimposing "/" on "0".

Examples of the set $K$ of weights include a set of all integers, a set of all real numbers, a set of all complex numbers, a matrix, and a set of Booleans (0 and 1). Besides, the set $K$ of weights can be a set of non-positive real numbers or a set of non-negative real numbers. In the embodiment, it is assumed that the initial weight as well as the final weight is equal to zero. A WFSA including an initial weight and a final weight can be converted into a WFSA not including an initial weight and a final weight. More specifically, with respect to an initial state of a WFSA, a new initial state is added along with a single transition from the new initial state to the original initial state. Then, if the original initial weight is assigned to the added transition, it becomes possible to convert the WFSA into a WFSA having the initial weight equal to zero. The same is the case about the final weight.

An expanded WFSA points to a WFSA in which boundary flags, appearance positions, and identifiers are assigned. In the embodiment, an expanded WFSA is also called a first automaton.

A boundary flag represents the boundary of a path in which input symbols are assigned. That is, when unnecessary paths are eliminated from an expanded WFSA, a boundary flag indicates the position of the boundary of a path that can be replaced with a single transition. Meanwhile, the boundary at the end of a particular path becomes the boundary at the start of another path that follows. Thus, the boundary indicating the start of the range of a particular path and the boundary indicating the end of the range of the following path are identified by the same boundary flag.

As an example, the boundary flags are set by a pattern recognition device that generates the expanded WFSA. For example, in the case in which the pattern recognition device is a speech recognition device that outputs a recognition result in the form of an expanded WFSA having words as the input symbols, a boundary flag represents the information about the start and the end of a path in the expanded WFSA corresponding to a word obtained by recognizing a particular speech. Alternatively, in the case in which the pattern recognition device performs optical character recognition (OCR) and outputs a recognition result in the form of an expanded WFSA having characters as input symbols, a boundary flag represents the information about the start and the end of a path in the expanded WFSA corresponding to a character obtained by recognizing a particular image.

An appearance position indicates the position of appearance of the boundary represented by a boundary flag. For example, an appearance position is a data position corresponding to a boundary in sequential data that has been input to the pattern recognition device. In the case in which the pattern recognition device is a speech recognition device, an appearance position can be the timing or the frame number at which the corresponding boundary appears. Alternatively, in the case in which the pattern recognition device performs OCR, an appearance position can be the coordinates of a boundary portion in an image.

An identifier is a value or a symbol that enables identification of paths which can be merged together. That is, an identifier is a value or a symbol that enables identification of paths, from among a plurality of paths starting from a particular boundary, which can be replaced with a single transition. Thus, in the case of eliminating unnecessary paths from an expanded WFSA; the WFSA from which the unnecessary paths have been eliminated has a single transition substituted for a plurality of paths having the same identifier from among a plurality of paths starting from a particular boundary.

For example, an identifier represents information for identifying the state or the transition in a search network that is responsible for the state or the transition in the expanded WFSA to which the identifier is assigned. For example, an identifier can be information (such as a state number in a hidden Markov model (HMM) or a state number in a search network) that enables identification of the state in a search network (such as a weighted finite state transducer (WFST)) that is referred to by the pattern recognition device while outputting the expanded WFSA.

In the embodiment, the boundary flags are assigned to the transitions in an expanded WFSA. Moreover, in the embodiment, with respect to a transition to which a boundary flag is assigned, the previous state represents the boundary at the end of the previous path as well as represents the boundary at the start of the following path.

Moreover, in the embodiment, the appearance position of a boundary represents the previous state of the transition to which the corresponding boundary flag is assigned. Furthermore, in the embodiment, an identifier is assigned to the next state of the transition assigned with a boundary flag. Thus, of a plurality of paths starting from a particular boundary, the paths in which the same identifier is assigned to the next state of the transition assigned with a boundary flag are replaced with a single transition. Although the identifiers can be assigned to other states too, the identifiers assigned to the states other than the next states of transitions are not taken into account in the embodiment.

In the embodiment, $b(e)$ represents whether or not a boundary flag is assigned to the transition e. Thus, when $b(e)$ is true, a boundary flag is assigned to the transition e. On the other hand, when $b(e)$ is false, no boundary flag is assigned to the transition e. Moreover, in the embodiment, $t(q)$ represents the appearance position corresponding to a state q, and id(q) represents the identifier corresponding to the state q.

Meanwhile, the expanded WFSA can also be configured in such a way that the boundary flags are assigned to the states. For example, assigning a boundary flag to the previous state of the transition e is expressed as b(p(e)), and assigning a boundary flag to the next state of the transition e is expressed as b(n(e)). Then, in an identical manner to the case in which the boundary flags are assigned to the transitions, it becomes possible to determine the presence or absence of a boundary flag. In a similar way, the expanded WFST can be configured in such a way that the appearance positions and the identifiers are assigned to the transitions.

Meanwhile, instead of using the boundary flag to explicitly indicate the boundary of a path assigned with input symbols, the boundary can be expressed in another manner. For example, instead of assigning the appearance positions to all states, the appearance positions can be assigned only to the previous states to the transitions serving as the boundaries. With that, if the appearance position is assigned to the previous state p(e) of the transition e, then the boundary flag b(e) can be set to true. However, if the appearance position is not assigned to the previous state p(e) of the transition e, then the boundary flag b(e) can be set to false. Aside from that, the identifiers can be assigned only to the next states of the transitions serving as the boundary. With that, if the appearance position is assigned to the next state n(e) of the transition e, b(e) can be set to true. However, if the appearance position is not assigned to the next state n(e) of the transition e, then the boundary flag b(e) can be set to false. Thus, the value, indicating whether or not a boundary is present need not be explicitly expressed using the boundary flag, but can be expressed using other information.

An appearance-position-assigned WFSA points to a WFSA in which appearance positions are assigned. In the embodiment, an appearance-position-assigned WFSA is called a second automaton. An appearance-position-assigned WFSA is generated from an expanded WFSA by eliminating unnecessary paths by means of eliminating empty transitions and merging the paths having the same appearance position and the same identifier into a single transition.

Each state of the appearance-position-assigned WFSA is assigned with the appearance position of the corresponding boundary in the expanded WFSA. Hence, the appearance-position-assigned WFSA becomes able to identify the occurrence position (the data position, the timing, or the coordinates) of an input symbol. For example, in an appearance-position-assigned WFSA that is generated by converting an expanded WFSA output from a speech recognition device, it is possible to identify the timing of when a word is spoken. Similarly, in an appearance-position-assigned WFSA that is generated by converting an expanded WFSA output from an OCR device, it is possible to identify the coordinates of a character in an image.

Configuration of Conversion Device 20

FIG. 1 is a diagram illustrating a configuration of a conversion device 20 according to the embodiment. Thus, given below is the explanation of the conversion device 20.

The conversion device 20 receives a first automaton representing an expanded WFSA; eliminates at least some of the unnecessary paths from the first automaton; and converts the first automaton into a second automaton representing an appearance-position-assigned WFSA. Then, the conversion device 20 outputs the second automaton.

The conversion device 20 includes a first-automaton storage 21, a best-path weight calculator 22, a best-path weight storage 23, a second-automaton storage 24, a converter 25, a first priority queue 26, and a second priority queue 27.

The first-automaton storage 21 is used to store a first automaton received from outside. In the first-automaton storage 21, the first automaton is stored in a constantly-accessible manner from the converter 25.

The best-path weight calculator 22 calculates, for each state included in the first automaton, the weight of the best path from the concerned state to a final state. As an example, the best-path weight calculator 22 follows a path in the reverse direction starting from a final state in the first automaton, and calculates the best value of the weight up to each state. More particularly, the best-path weight calculator 22 calculates the best value of the weight from a final state to the concerned state by implementing the Dijkstra algorithm, the Bellman-Ford algorithm, or the generic single-source shortest distance algorithm. Moreover, if the first automaton does not include cyclic paths, then the best value of the weight from a final state to the concerned state can be calculated using a distance calculation algorithm which is implementable in a directed acyclic graph. Meanwhile, alternatively, regarding the best path for each state included in the first automaton, the best-path weight calculator 22 can obtain the weight from outside.

The best-path weight storage 23 is used to store, for each state included in the first automaton, the weight of the best path from the concerned state to a final state as calculated by the best-path weight calculator 22. When the converter 25 specifies a state, the best-path weight storage 23 returns the best-path weight corresponding to the specified state. As an example, in the best-path weight storage 23, the states and the respective best-path weights are stored in a corresponding manner using an associative array. Moreover, if the states are identifiable by numbers, then the states and the respective best-path weights can be stored in a corresponding manner using an array.

The second-automaton storage 24 is used to store a second automaton in a constantly-accessible manner from the converter 25. After the converter 25 completes a conversion operation, the second-automaton storage 24 outputs the complete second automaton to the outside.

The converter 25 converts a first automaton to a second automaton. More particularly, while constantly accessing the first-automaton storage 21 and the second-automaton storage 24, the converter 25 eliminates at least some of the unnecessary paths present in the first automaton and generates a second automaton.

The converter 25 includes a specifying unit 41, a search unit 42, a state register 43, a transition register 44, and an appearance position register 45.

The specifying unit 41 specifies a single state in the first automaton as the start position for searching. Once the specifying unit 41 specifies the start position, the search unit 42 searches, on an identifier-by-identifier basis, for a path in the first automaton in which the weight from the specified start position to the next boundary is the best. That is, on an identifier-by-identifier basis, of the paths starting from the specified start position to the next boundary, the search unit 42 searches for a path which has the best weight which is obtained by combining the weight of the concerned path and the best path from the next boundary to a final state. Once the search up to the next boundary is performed for all paths starting from the specified start position; the search unit 42 returns, to the specifying unit 41, the state of the head of the retrieved path for each identifier.

Thereafter, every time the search unit 42 completes the search, the specifying unit 41 specifies a new start position. More specifically, the specifying unit 41 specifies, as the start position, the state of the head of such a retrieved path in the first automaton in which a combined weight, which is obtained by adding the accumulated weight from an initial state to the state of the head of the retrieved path and the weight of the best path from the state of the head of the retrieved path to the final state of the retrieved path, is the best. Meanwhile, at the beginning of the conversion, the specifying unit 41 calculates the combined weight under the assumption that the path including only an initial state is the retrieved path, and specifies the start position. When all of the paths are searched up to a final state, the specifying unit 41 ends the processes.

At the start of the search performed by the search unit 42, the state register 43 registers a new initial state in the second automaton in a corresponding manner to each initial state in the first automaton. With that, the state register 43 can add initial states in the second automaton.

Moreover, during the search performed by the search unit 42, when the search reaches the next boundary from the start position, the state register adds a new state in the second automaton in a corresponding manner to the state of the head of the retrieved path. Thus, during the search performed by the search unit 42, every time the search for a path having the best weight from the start position to the next boundary is completed, the state register 43 registers a new state in the second automaton. With that, the state register 43 can add states in the second automaton in a corresponding manner to the boundary positions in the first automaton.

Furthermore, during a search performed by the search unit 42, when the search reaches a final state from the start position, the state register 43 adds a new state in the second automaton in a corresponding manner to the state of the head of the retrieved path. With that, the state register 43 can add a final state in the second automaton.

However, if an already-corresponding new state or an already-corresponding final state is already registered in the second automaton, the state register 43 does not register a new state or a new final state. Thus, if the search unit 42 searches for the same state, then the state register 43 can avoid duplicate registration of the same state in the second automaton.

During a search performed by the search unit 42, when the search reaches the next boundary from the start position, the transition register 44 registers a new transition in the second automaton in a corresponding manner to the start position and the state of the head in the retrieved path. Thus, during the search performed by the search unit 42, every time the search for a path having the best weight from the start position to the next boundary is completed, the transition register 44 registers a new transition in the second automaton. Furthermore, during a search performed by the search unit 42, when the search reaches a final state from the start position, the transition register 44 adds a new transition in the second automaton in a corresponding manner to the start position and the state of the head of the retrieved path. With that, the transition register 44 can add transitions in the second automaton.

More particularly, as a transition in the second automaton, the transition register 44 registers the previous state, the next state, the weight, and an input symbol sequence. The previous state points to the state that has been registered in the second automaton in a corresponding manner to the state of the start position. The next state points to the state that has been registered in the second automaton in a corresponding manner to the state of the head (or, if the search has reached a final state, in a corresponding manner to the final state) of the retrieved path having the best weight. The weight points to the accumulated weight in the retrieved path having the best weight. The input symbol string points to the input symbol string assigned to the retrieved path having the best weight.

Every time a new state is registered in the second automaton (that is, every time the search reaches the next boundary from the start position), the appearance position register 45 registers, in the second automaton, the corresponding appearance position that has been assigned in the first automaton. With that, the appearance position register 45 can assign the appearance position of the boundary of the second automaton to the second automaton.

The first priority queue 26 as well as the second priority queue 27 outputs the elements stored therein in order of priority.

More particularly, the first priority queue 26 is used to store, as elements, sets of information that are related to the first automaton and that contain the state of the head of the path retrieved by the search unit 42 and the accumulated weight from an initial state to the state of the head of the retrieved path. Then, the first priority queue 26 outputs the elements in order from the element including the state of the head of the retrieved path having the best combined weight. Herein, the combined weight is obtained by adding the accumulated weight from an initial state to the state of the head of the retrieved path and the weight of the best path from the state of the head of the retrieved path to a final state.

The second priority queue 27 is used to store, as elements, sets of information that are related to the first automaton and that contain the state of the head of the path being searched and the path weight from the start position to a state midway through the search. Then, the second priority queue 27 outputs the elements in order from the element including the state of the head that belongs to the path being searched and for which the weight obtained by adding the path weight and the weight of the best path from the state of the head of the path being searched to a final state is the best.

Then, as an example, the specifying unit 41 and the search unit 42 access the first priority queue 26 as well as the second priority queue 27, and proceed to specify and search the start position. More particularly, when a search reaches the next boundary from the start position, the search unit writes an element in the first priority queue 26. Then, the specifying unit 41 obtains a single element from the first priority queue 26. Subsequently, the specifying unit 41 specifies, as the next start position, the state of the head of the retrieved path included in the obtained element. With that, the specifying unit 41 can specify, as the start position, the state of the head in the retrieved path having the best combined weight.

Moreover, the search unit 42 retrieves a single element from the second priority queue 27. Then, for each outgoing transition from the state being searched and included in the retrieved element, the search unit 42 generates a new element in which the next state is the state being searched, and takes the search forward by writing the generated new element in the second priority queue 27. With that, while searching for the paths from the start position to the next boundary, the search unit 42 can perform the search in order from the best path.

Process Flow

Figure 2:
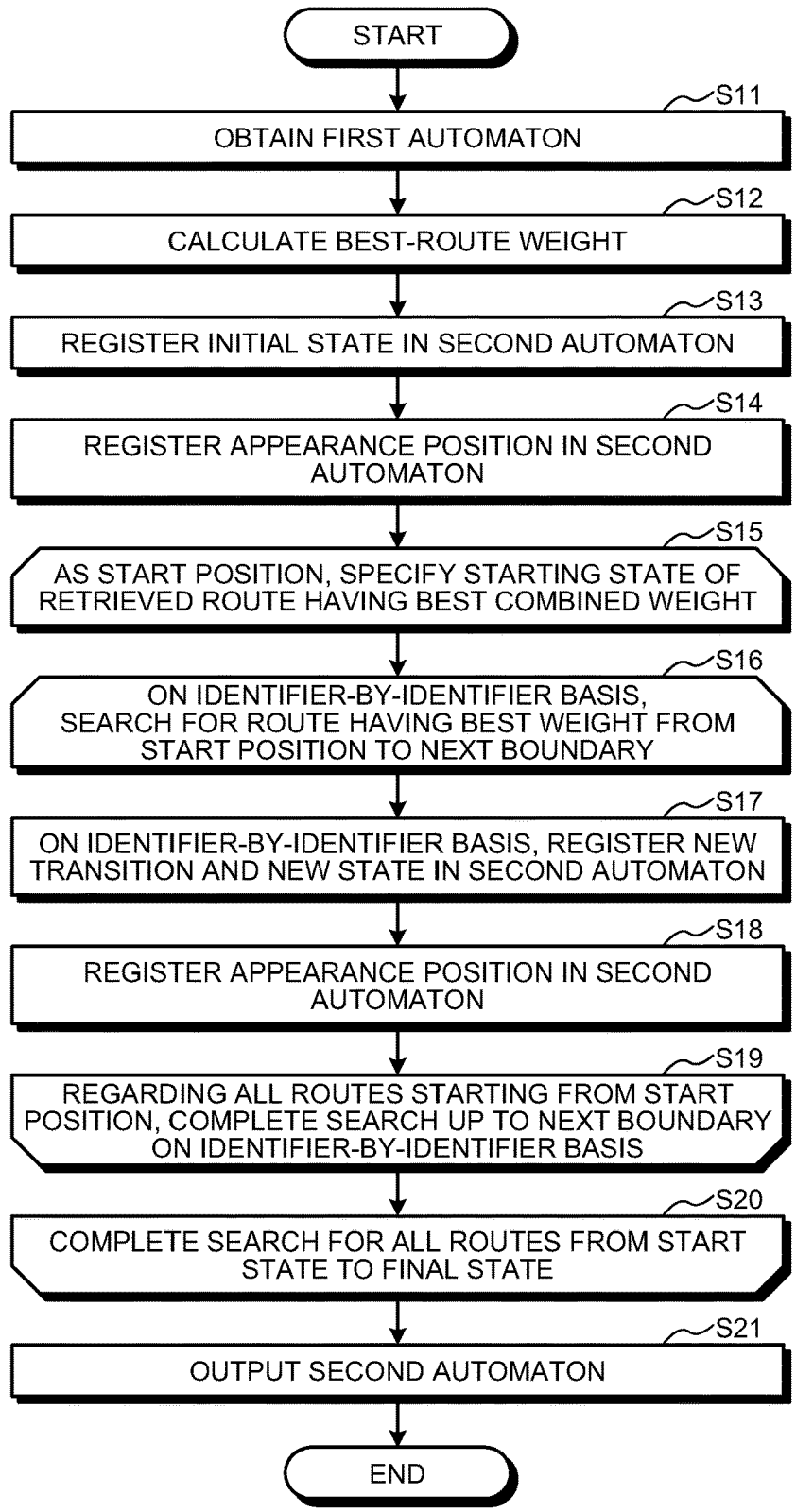
FIG. 2 is a flowchart for explaining a sequence of processes performed in the conversion device according to the embodiment.

FIG. 2 is a flowchart for explaining a sequence of processes performed in the conversion device 20 according to the embodiment. Explained below is the outline of the sequence of processes performed in the conversion device 20.

Firstly, the conversion device 20 obtains a first automaton (Step S11). Then, for each state in the first automaton, the conversion device 20 calculates the best-weight path (Step S12). However, in the case of obtaining the best-weight paths from the outside, the conversion device 20 need not perform the calculation.

Subsequently, the conversion device 20 registers an initial state in the second automaton in a corresponding manner to each initial state in the first automaton (Step S13). Then, with respect to each initial state registered in the second automaton, the conversion device 20 registers the appearance position that has been assigned to the corresponding initial state in the first automaton (Step S14).

Subsequently, the conversion device 20 performs a loop operation from Step S15 to Step S20. That is, the conversion device 20 specifies, as the start position, the state of the head of the retrieved path having the best combined weight (Step S15). Meanwhile, at the beginning of the conversion, the conversion device 20 calculates the combined weight by treating the path including only an initial state as the retrieved path, and specifies the start position.

Upon specifying the start position, the conversion device 20 performs a loop operation from Step S16 to Step S19. Firstly, on an identifier-by-identifier basis, the conversion device 20 searches for the path having the best weight from the start position to the next boundary (Step S16). Then, on an identifier-by-identifier basis, the conversion device 20 registers a new transition and a new state in the second automaton (Step S17). Subsequently, on an identifier-by-identifier basis, the conversion device 20 registers, with respect to the state registered in the second automaton, the corresponding appearance position assigned in the first automaton (Step S18).

When all paths starting from the start positions are searched up to the next boundary on an identifier-by-identifier basis, the system control exits the inner loop and returns to the outer loop (Step S19).

Then, once the search is completed for all paths from the start state to a final state in the first automaton, the system control exits the outer loop too and proceeds to Step S21 (Step S20). Subsequently, the conversion device 20 outputs the second automaton that has been generated (Step S21). That marks the end of the operations.

Pseudo Code

Figures 4, 5:
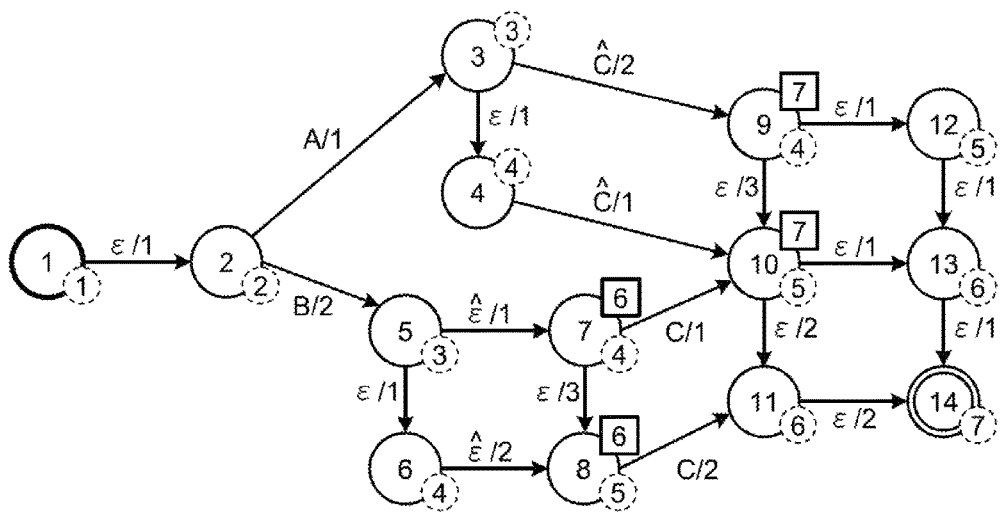
FIG. 4 is a pseudo code for explaining an operation of specifying a start position.
FIG. 5 is a diagram illustrating an example of a first automaton.

FIG. 3 is a pseudo code 300 for explaining the operation of searching for the best path from the specified start position to the next boundary. FIG. 4 is a pseudo code 400 for explaining the operation of specifying the start position.

The first automaton (the expanded WFSA) is expressed as $A=(Q, E, \Sigma, K, I, F, \lambda, \rho)$. The post-conversion second automaton (an appearance-position-assigned WFSA) is expressed as $A'=(Q', E', \Sigma^*, K, I', \lambda', \rho')$.

Herein, the elements of the set $\Sigma^*$ represent a sequence of the elements of the set $\Sigma$. For example, for $\{a, b\} \in \Sigma$, $\{\varepsilon, a, b, aa, ab, ba, bb, aa, \ldots\} \in \Sigma^*$ holds true. Moreover, in the embodiment, the first automaton as well as the second automaton has the initial weight and the final weight equal to zero. Furthermore, in the embodiment, it is assumed that, smaller the weight of a path, more suitable is the path.

In the pseudo code 300 and the pseudo code 400, w(q) represents the weight of the best path from the state q to a state included in the state F of final states. In the embodiment, the weight w(q) is stored in advance in the best-path weight storage 23 illustrated in FIG. 1.

Moreover, in the pseudo code 300 and the pseudo code 400, B represents a set of identifiers. Furthermore, P represents a set of retrieved paths. Moreover, M represents a set of 3-tuples (state included in Q, state included in Q', weight of transition having boundary flag assigned thereto). Every time the search passes a boundary, the conversion device 20 adds the 3-tuple to the set M as may be necessary.

In the pseudo code 300 and the pseudo code 400, S represents a priority queue in which a 7-tuple (state, previous state, weight, previous weight, input symbol string, previous input symbol, boundary flag) is stored as an element. In the embodiment, the priority queue S is implemented using the second priority queue 27 illustrated in FIG. 1.

In the priority queue S, when the state representing the first value of the 7-tuple is q, and when the weight representing the third value of the 7-tuple is $w_q$; then $w_q+w(q)$ represents the priority. Moreover, pop(S) represents an operation of obtaining the element having the highest priority from the priority queue S. Furthermore, push (S, 7-tuple) represents an operation of adding the 7-tuple as an element in the priority queue S. In the embodiment, since it is better to have a smaller weight, the operation pop(S) is performed to obtain the element having the smallest value of the priority ($w_q+w(q)$). However, if a path having a greater weight is more suitable, then the operation pop(S) is performed to obtain the element having the greatest value of the priority ($w_q+w(q)$).

In the pseudo code 300 and the pseudo code 400, $S_{sym}$ represents a priority queue used in storing a 5-tuple (state, previous state, accumulated weight, weight, input symbol string) as an element. Herein, the priority queue $S_{sym}$ is implemented using the first priority queue 26 illustrated in FIG. 1.

In the priority queue $S_{sym}$, when the state representing the first value in the 5-tuple is q, and when the weight representing the third value in the 5-tuple is $w_q$; then $w_q+w(q)$ represents the priority. Moreover, pop(S) represents an operation of obtaining the element having the highest priority from the priority queue $S_{sym}$. Furthermore, push (S, 5-tuple) represents an operation of adding the 5-tuple as an element in the priority queue $S_{sym}$. In the embodiment, since it is better to have a smaller weight, the operation pop($S_{sym}$) is performed to obtain the element having the smallest value of the priority ($w_q+w(q)$). However, if a path having a greater weight is more suitable, then the operation pop($S_{sym}$) is performed to obtain the element having the greatest value of the priority ($w_q+w(q)$).

The conversion device 20 calls the pseudo code 300 illustrated in FIG. 3 from the pseudo code 400 illustrated in FIG. 4 (described later). In this case, the priority queue $S_{sym}$; the set M; $q_i$; $q_{pi}$; $w_i$; and $x_i$ are transferred. Herein, $q_i$ represents the state serving as the specified start position. Moreover, $q_{pi}$ represents the previous state to the state serving as the start position. However, if the state $q_i$ is an initial state, then there is no previous state. In that case, to the state $q_{pi}$ is assigned the state $q_i$. Furthermore, $w_i$ represents the accumulated weight in the best path from the state $q_{pi}$ to the state $q_i$. Moreover, $x_i$ represents the input symbol string in the best path from the state $q_{pi}$ to the state $q_i$.

Firstly, explained below with reference to the pseudo code 300 illustrated in FIG. 3 is the operation of searching for the best path from the specified start position to the next boundary.

At the first line, the conversion device 20 initializes the sets B and P to empty sets.

At the second line, the conversion device 20 obtains, from the set M, the state in the second automaton A' corresponding to the state $q_i$. The obtained state is referred to as $q'_i$.

At the third line, the conversion device 20 initializes the priority queue S. In the 7-tuple used for the purpose of initialization; the first value is $q_i$, the second value is $q_{pi}$, the third value is $w_i$, the fourth value is 0, the fifth value is $x_i$, the sixth value is ε, and the seventh value is false.

At the fourth line, the conversion device 20 determines whether or not the priority queue S is an empty set. If the priority queue S is not an empty set, then the conversion device 20 performs the operations from the fifth line to the 34-th line in a repeated manner. On the other hand, if the priority queue S is an empty set, then the conversion device 20 proceeds to the operation at the 35-th line.

At the fifth line, the conversion device 20 obtains a single element from the priority queue S and sets the first value to q, sets the second value to $q_p$, sets the third value to w, sets the fourth value to $w_p$, sets the fifth value to x, sets the sixth value to $x_p$, and sets the seventh value to b.

At the sixth line, the conversion device 20 determines whether or not the first value q is included in the set P. If the first value q is not included in the set P, then the conversion device 20 performs the operations from the seventh line to the 34-th line. On the other hand, if the first value q is included in the set P, then the conversion device 20 returns to the operation at the fourth line.

At the seventh line, the conversion device 20 adds the first value q to the set P. As a result of performing the operations at the sixth and seventh lines; during the period of time starting from the calling of the pseudo code 300 to the completion of the operations, it becomes possible for the conversion device 20 to avoid duplication of the operations from the seventh line to the 34-th line with respect to the same state. Consequently, if the search with respect to the state q has already been completed, then the conversion device 20 terminates any search starting from the state q and reduces the amount of calculation.

At the eighth line, the conversion device 20 determines whether or not the state q is included in the set F of final states, that is, determines whether or not the state q is a final state. Thus, the conversion device 20 determines whether or not the search has reached a final state. If the state q is included in the set F of final states, then the conversion device 20 performs the operations from the ninth line to the 15-th line. On the other hand, if the state q is not included in the set F of final states, then the conversion device 20 proceeds to the operation at the 16-th line.

At the 16-th line, the conversion device 20 determines whether or not the seventh value b is set to true. If the seventh value b is set to true, then it implies that the search has passed a boundary. That is, herein, the conversion device 20 determines whether or not the search has reached a boundary. If the seventh value b is set to true, then the conversion device 20 performs the operations from the 17-th line to the 27-th line. On the other hand, if the seventh value b is not set to true, then the conversion device 20 performs the operations from the 29-th line to the 34-th line.

Firstly, the explanation is given for the operations from the 29-th line to the 34-th line. That is, the explanation is given for the operations performed by the conversion device 20 in the case in which the search has neither reached a final state nor reached a boundary.

The 29-th line indicates that the operations from the 30-th line to the 34-th line are performed with respect to each transition having the state q as the previous state p(e), that is, with respect to each outgoing transition from the state q. Thus, the conversion device 20 performs the operations from the 30-th line to the 34-th line with respect to the outgoing transition from the state q.

At the 30-th line, the conversion device 20 determines whether or not the next state n(e) of the transition e is included in the set P. If the next state n(e) of the transition e is not included in the set P, then the conversion device 20 performs the operations from the 31-st line to the 34-th line. On the other hand, if the next state n(e) of the transition e is included in the set P, then the conversion device 20 performs the operations from the 30-th line to the 34-th line with respect to the subsequent transition e. Meanwhile, since the determination for the same purpose is performed at the sixth line, the conversion device 20 may not perform the determination at the 30-th line. However, by performing the determination at the 30-th line, the conversion device 20 is spared from adding unnecessary elements in the priority queue S, thereby enabling achieving reduction in the amount of calculation.

At the 31-st line, the conversion device 20 determines whether or not the boundary flag b(e) of the transition e is set to true. If the boundary flag b(e) of the transition e is set to true, then the conversion device 20 performs the operation at the 32-nd line. On the other hand, if the boundary flag b(e) of the transition e is not set to true, then the conversion device 20 performs the operation at the 34-th line.

At the 32-nd line, the conversion device 20 adds a new 7-tuple (next state n(e) of transition e, q, w+w(e), w(e), x, i(e), true) in the priority queue S.

At the 34-th line, the conversion device 20 adds a new 7-tuple (next state n(e) of transition e, q, w+w(e), 0, X·i(e), ε, false) in the priority queue S. Herein, x·i(e) represents the operation of concatenating, at the end of the input symbol string x, the input symbol assigned to the transition e. For example, for x=ab and i(e)=c; x·i(e) becomes equal to abc.

Given below is the explanation from the 17-th line to the 27-th line. That is, the explanation is given for the operations performed by the conversion device 20 in the case in which the search has not reached a final state but has reached a boundary.

At the 17-th line, the conversion device 20 determines whether or not the identifier id(q) is included in the set B. If the identifier id(q) is not included in the set B, then the conversion device 20 performs the operations from the 18-th line to the 27-th line. On the other hand, if the identifier id(q) is included in the set B, then the conversion device 20 returns to the operation at the fourth line.

At the 18-th line, the conversion device 20 adds the identifier id(q) to the set B. As a result of performing the operations at the 17-th and 18-th lines; during the period of time starting from the calling of the pseudo code 300 to the completion of the operations, it becomes possible for the conversion device 20 to avoid duplication of the operations from the 18-th line to the 27-th line with respect to the same identifier. Hence, for the same identifier, the conversion device 20 becomes able to perform the operations from the 19-th line to the 27-th line with respect to only the path having the highest priority, that is, with respect to only the best path.

At the 19-th line, the conversion device 20 determines whether or not the 3-tuple in which the first value is q is included in the set M. If the 3-tuple in which the first value is q is included in the set M, then the conversion device 20 performs the operations at the 20-th and 21-st lines. On the other hand, if the 3-tuple in which the first value is q is not included in the set M, then the conversion device 20 performs the operations from the 23-rd line to the 26-th line.

At the 20-th line, the conversion device 20 obtains, from the set M, the second and third values of the 3-tuple in which the first value is q. The second value is referred to as $q'_n$ and the third value is referred to as $w_m$.

At the 21-st line, the conversion device 20 adds a new transition to the set E' of transitions in the second automaton A'. Regarding the new transition; $q'_i$ represents the previous state, $q'_n$ represents the next state, x represents the input symbol string, and $w-w_m$ represents the weight. After performing the operation at the 21-st line, the conversion device 20 performs the operation at the 27-th line.

At the 23-rd line, the conversion device 20 creates a new state $q'_n$ that is not included in the state Q' of states in the second automaton A'.

At the 24-th line, the conversion device 20 assigns, to the new state $q'_n$, the appearance position that has been assigned to the state $q_p$ in the first automaton A.

At the 25-th line, the conversion device 20 adds the new state $q'_n$ to the state Q' of states in the second automaton A'. Moreover, the conversion device 20 adds the 3-tuple (q, $q'_n$, $w_p$) to the set M.

At the 26-th line, the conversion device 20 adds a new transition to the set E' of transitions in the second automaton A'. Regarding the new transition, $q'_i$ represents the previous state, $q'_n$ represents the next state, x represents the input symbol string, and $w-w_p$ represents the weight. After performing the operation at the 26-th line, the conversion device 20 performs the operation at the 27-th line.

At the 27-th line, the conversion device 20 adds a new 5-tuple (q, $q_p$, w, $w_p$, $x_p$) to the priority queue $S_{sym}$.

Given below is the explanation of the operations performed from the ninth line to the 15-th line. That is, the explanation is given for the operations performed by the conversion device 20 in the case in which the search has reached a final state.

At the ninth line, the conversion device 20 determines whether or not the 3-tuple in which the first value is q is included in the set M. If the 3-tuple in which the first value is q is included in the set M, then the conversion device 20 performs the operation at the 10-th line. On the other hand, if the 3-tuple in which the first value is q is not included in the set M, then the conversion device 20 performs the operations from the 12-th line to the 14-th line.

At the 10-th line, the conversion device 20 obtains, from the set M, the second value of the 3-tuple in which the first value is q. The obtained value is referred to as $q'_n$. After performing the operation at the 10-th line, the conversion device 20 performs the operation at the 15-th line.

At the 12-th line, the conversion device 20 creates a new state $q'_n$ that is not included in the set Q' of states in the second automaton A'.

At the 13-th line, the conversion device 20 assigns, to the new state $q'_n$, the appearance position that has been assigned to the state q in the first automaton A.

At the 14-th line, the conversion device 20 adds the new state $q'_n$ to the state Q' of states and the set F' of final states in the second automaton A'. Moreover, the conversion device 20 adds a new 3-tuple (q, $q'_n$, 0) to the set M. After performing the operation at the 14-th line, the conversion device 20 performs the operation at the 15-th line.

At the 15-th line, the conversion device 20 adds a new transition to the set E' of transitions in the second automaton A'. Regarding the new transition; $q'_i$ represents the previous state, $q'_n$ represents the next state, x represents the input symbol string, and w represents the weight.

Meanwhile, as a result of performing the operation at the fourth line, when no element is anymore included in the priority queue S, the conversion device 20 lastly performs the operation at the 35-th line. At the 35-th line, the conversion device 20 returns the priority queue $S_{sym}$ and the set M as the processing result.

Explained below with reference to FIG. 4 is the operation of specifying the start position. After obtaining the first automaton A, the conversion device 20 starts a conversion operation from the 101-st line of the pseudo code 400 illustrated in FIG. 4. The second automaton A' is created as a result of performing this conversion operation. Hence, at the beginning of the conversion operation, the second automaton A' does not include any states and transitions. More particularly, the sets Q', E', I', and F' are empty sets at the start.

At the 101-st line, the conversion device 20 initializes the priority queue $S_{sym}$ and the set M to empty sets.

The 102-nd line indicates that the operations from the 103-rd line to the 106-th line are performed for each state included in the set I of initial states. Thus, for each state q included in the set I of initial states, the conversion device 20 performs the operations from the 103-rd line to the 106-th line.

At the 103-rd line, the conversion device 20 creates a new state $q'_n$ that is not included in the state Q' of states in the second automaton A'.

At the 104-th line, the conversion device 20 assigns, to the new state $q'_n$, the appearance position that has been assigned to the state q in the first automaton A.

At the 105-th line, the conversion device 20 adds the new state $q'_n$ to the state Q' of states in the second automaton A'. Moreover, the conversion device 20 adds the new state $q'_n$ to the state I' of initial states in the second automaton A'. Furthermore, the conversion device 20 adds a 3-tuple (q, $q'_n$, 0) to the set M.

At the 106-th line, the conversion device 20 adds a new 5-tuple (q, q, 0, 0, ε) in the priority queue $S_{sym}$.

At the 107-th line, the conversion device 20 determines whether or not the priority queue $S_{sym}$ is an empty set. If the priority queue $S_{sym}$ is not an empty set, then the conversion device 20 performs the operations at the 108-th and 109-th lines in a repeated manner. On the other hand, if the priority queue $S_{sym}$ is an empty set, then it marks the end of the operations of the pseudo code 400.

At the 108-th line, the conversion device 20 obtains the 5-tuple from the priority queue $S_{sym}$; and sets the first value to $q_i$, the second value to $q_{pi}$, the fourth value to $w_i$, and the fifth value to $x_i$.

At the 109-th line, the conversion device 20 calls the pseudo code 300 illustrated in FIG. 3 with following arguments: the priority queue $S_{sym}$ as the first argument; the set M as the second argument; the state $q_i$ as the third argument; the state $q_{pi}$ as the fourth argument; the weight $w_i$ as the fifth argument; and the input symbol string $x_i$ as the sixth argument. Then, the priority queue $S_{sym}$ and the set M are returned as the return values of the pseudo code 300 illustrated in FIG. 3. Thus, the conversion device 20 updates the priority queue $S_{sym}$ and the set M with the return values.

Specific Example of Operations

Figure 6:
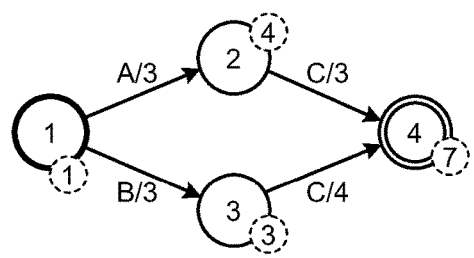
FIG. 6 is a diagram illustrating an example of a second automaton.

In FIG. 5 is illustrated an example of the first automaton (the expanded WFSA). In FIG. 6 is illustrated an example of the second automaton (the appearance-position-assigned automaton) that is generated by the conversion device 20 by eliminating unnecessary paths.

Given below is the explanation of a specific example of the operations performed in the case in which the conversion device 20 converts the first automaton illustrated in FIG. 5 into the second automaton illustrated in FIG. 6 according to the pseudo code 300 and the pseudo code 400.

In FIGS. 5 and 6, circles represent states, and the numbers written in the circles represent state numbers. Moreover, the circle drawn with a heavy line represents an initial state. Furthermore, the double-lined circle represents a final state. In the example illustrated in FIG. 5, a state 14 is a final state. In the example illustrated in FIG. 6, a state 4 is a final state.

Moreover, arrows represent transitions. The source of an arrow represents a previous state, while the destination of an arrow represents a next state. In the character string written close to each arrow, on the left side of "/" is written the input symbol and on the right-hand side of "/" is written the weight. Furthermore, the numbers written inside small dashed-line circles, each of which is drawn in an overlapping manner on a circle representing a state, represent the appearance positions assigned to the respective states. In this example, the appearance positions are assigned in such a way that, every time a transition is passed, the values of the appearance positions increase by one. Alternatively, as long as the values of the appearance values increase or decrease every time a transition is passed, the assignment can be done in any other manner. If the appearance positions are coordinates in a two-dimensional image, then each appearance position is made of two values. Meanwhile, the numbers written in quadrangles drawn close to the states represent identifiers. The symbol $\wedge$ written above the input symbols represents the boundary flag. For example, if e3→9 represents the transition from a state 3 to a state 9 illustrated in FIG. 5, then the boundary flag b(e3→9) is set to true.

Meanwhile, in the explanation of the example, in order to distinguish between the first automaton and the second automaton, the state numbers of the second automaton are followed by the apostrophe '. Prior to the conversion operation, the second automaton is empty. Hence, Q'={ }, E'={ }, I'={ }, and F'={ } hold true.

Firstly, prior to the conversion operation, for each state in the first automaton, the weight of the best path from the concerned state to a final state is calculated. In this example, w(1)=6, w(2)=5, w(3)=4, w(4)=3, w(5)=4, w(6)=6, w(7)=3, w(8)=4, w(9)=3, w(10)=2, w(11)=2, w(12)=2, w(13)=1, and w(14)=0 hold true.

Once the conversion operation starts, firstly, at the first line of the pseudo code 400 illustrated in FIG. 4, the set M and the priority queue $S_{sym}$ are initialized. Herein, since the state 1 is the initial state, q=1 holds true at the 102-nd line. At the 103-rd line, a new state is created and set to q'$_n$=1'. This new state corresponds to the state 1 illustrated in FIG. 6. Herein, since t(q)=t(1)=1 holds true; t(1')=1 holds true at the 104-th line. At the 105-th line, Q'={1'}, I={1'}, and M={(1, 1', 0)} hold true. At the 106-th line, when a 5-tuple is added to the priority queue $S_{sym}$, it results in $S_{sym}$={(1, 1, 0, 0, ε)}. Since the priority queue $S_{sym}$ is not an empty set, the system control proceeds to the 108-th line at which q$_i$=1, q$_{pi}$=1, w$_i$=0, x$_i$=ε, and $S_{sym}$={ } hold true. At the 109-th line, the pseudo code 300 illustrated in FIG. 3 is called.

At the first line of the pseudo code 300 illustrated in FIG. 3, the sets B and P are initialized to empty sets. At the second line, q'$_i$=1' holds true. At the third line, a 7-tuple is added to the priority queue S. Thus, S={(1, 1, 0, 0, ε, ε, false)} holds true. Since the priority queue S is not an empty set, the system control proceeds to the fifth line. The priority queue S includes only a single element. Hence, regardless of the priority, at the fifth line; q=1, q$_p$=1, w=0, w$_p$=0, x=ε, x$_p$=ε, and b=false hold true. Since one element is taken out from the priority queue S, it becomes an empty set. At this stage, q=1 holds true, and the set P does not include 1. Hence, the system control proceeds to the seventh line. At the seventh line, 1 is added to the set P. Thus, P={1} holds true. Since the state 1 is not a final state, the system control proceeds to the 16-th line. Since the boundary flag b is set to false, the condition at the 16-th line is not satisfied. Thus, the system control proceeds to the 29-th line. The state 1 has only a single outgoing transition. For that transition, the operations from the 30-th line to the 34-th line are performed. Since n(e)=2 holds true and P={1} holds true, the condition at the 30-th line is satisfied. Thus, the system control proceeds to the 31-st line. Regarding the transition from the state 1 to the state 2, the input symbol does not have the symbol $\wedge$ written above it. It implies that the boundary flag b(e) is set to false. Therefore, at the 34-th line, S={(2, 1, 1, 0, ε, ε, false)} holds true.

Returning to the fourth line, since the priority queue S is not an empty set, the system control proceeds to the fifth line. At the fifth line; q=2, q$_p$=1, w=1, w$_p$=0, x=ε, x$_p$=ε, and b=false hold true. Moreover, S={ } also holds true. The set P does not include 2. Hence, the system control proceeds to the seventh line. At the seventh line, P={1, 2} holds true. Since the state 2 is not a final state and since the boundary flag b is set to false, the system control proceeds to the 29-th line. The state 2 has two outgoing transitions. Firstly, for the transition having the state 3 as the next state, the operations from the 30-th line to the 34-th line are performed. Since n(e)=3 holds true, the condition at the 30-th line is satisfied. Since the boundary flag b(e) is set to false, the condition at the 31-st line is not satisfied. Therefore, at the 34-th line, S={(3, 2, 2, 0, A, ε, false)} holds true. The fifth value is set to A because ε represents an empty symbol string and ε·A=A holds true. Subsequently, regarding the transition having the state 5 as the next state, the operations are performed in an identical manner. As a result, at the 34-th line, S={(3, 2, 2, 0, A, ε, false), (5, 2, 3, 0, B, ε, false)} holds true.

Returning to the fourth line, since the priority queue S is not an empty set, the system control proceeds to the fifth line. In the priority queue S, the element having 3 as the first value has the priority of 2+w(3)=2+4=6. Similarly, the element having 5 as the first value has the priority of 3+w(5)=3+4=7. Herein, a smaller value indicates a higher priority. Hence, at the fifth line; q=3, q$_p$=2, w=2, w$_p$=0, x=A, x$_p$=ε, and b=false hold true. Thus, S={(5, 2, 3, 0, B, ε, false)} holds true. The set P does not include 3. Hence, at the seventh line, P={1, 2, 3} holds true. Since the state 3 is not a final state and the boundary flag b is set to false, the system control proceeds to the 29-th line. The state 3 has three outgoing transitions. Firstly, for the transition having the state 4 as the next state, the operations from the 30-th line to the 34-th line are performed. Since n(e)=4 holds true, the condition at the 30-th line is satisfied. Since the boundary flag b(e) is set to false, the condition at the 31-st line is not satisfied.

Therefore, at the 34-th line, S={(5, 2, 3, 0, B, ε, false), (4, 3, 3, 0, A, ε, false)} holds true. Subsequently, regarding the transition having the state 9 as the next state, the operations are performed in an identical manner. Since the boundary flag b(e) is set to true; at the 32-nd line, S={(5, 2, 3, 0, B, ε, false), (4, 3, 3, 0, A, ε, false), (9, 3, 4, 2, A, C, true)} holds true.

Returning to the fourth line, since the priority queue S is not an empty set, the system control proceeds to the fifth line. In the priority queue S, the element having 5 as the first value has the priority of 3+w(5)=3+4=7. Similarly, the element having 4 as the first value has the priority of 3+w(4)=3+3=6. Moreover, the element having 9 as the first value has the priority of 4+w(9)=4+3=7. Hence, at the fifth line; q=4, $q_p$=3, w=3, $w_p$=0, x=A, $x_p$=ε, and b=false hold true. Thus, S={(5, 2, 3, 0, B, ε, false), (9, 3, 4, 2, A, C, true)} holds true. At the seventh line, P={1, 2, 3, 4} holds true. Since the state 4 is not a final state and the boundary flag b is set to false, the system control proceeds to the 29-th line. The state 4 has only one outgoing transition. At the 32-nd line, S={(5, 2, 3, 0, B, ε, false), (9, 3, 4, 2, A, C, true), (10, 4, 4, 1, A, C, true)} holds true.

Returning to the fourth line, since the priority queue S is not an empty set, the system control proceeds to the fifth line. In the priority queue S, the newly-added element has the priority of 4+w(10)=4+2=6. Hence, at the fifth line; q=10, $q_p$=4, w=4, $w_p$=1, x=A, $x_p$=C, and b=true hold true. Thus, S={(5, 2, 3, 0, B, ε, false), (9, 3, 4, 2, A, C, true)} holds true. At the seventh line, P={1, 2, 3, 4, 10} holds true. Since the state 10 is not a final state and the boundary flag b is set to true, the system control proceeds to the 17-th line. At this stage, since the set B is an empty state, the system control proceeds to the 18-th line. Then, since id(10)=7 holds true, B={7} holds true. Since the 3-tuple having 10 as the first value is not included in the set M, the system control proceeds to the 23-rd line. Subsequently, a new state is created as $q'_n$=2'. Herein, the new state $q'_n$=2' corresponds to the state 2 illustrated in FIG. 6. Since $t(q_p)$=t(4)=4 holds true; at the 24-th line, t(2')=4 holds true. At the 25-th line, Q'={1', 2'} and M={(1, 1', 0), (10, 2', 1)} hold true. At the 26-th line, a transition (1', 2', A, 3) is added to the set E'. At the 27-th line, $S_{sym}$={(10, 4, 4, 1, C)} holds true.

Returning to the fourth line, since the priority queue S is not an empty set, the system control proceeds to the fifth line. In the priority queue S, both the elements have the priority of 7. Therefore, any one of those elements can be processed first. Herein, it is assumed that the element having 9 as the first value is obtained from the priority queue S using the operation pop(S). As a result, q=9, $q_p$=3, w=4, $w_p$=2, x=A, $x_p$=C, and b=true hold true. Thus, S={(5, 2, 3, 0, B, ε, false)} holds true. At the seventh line, P={1, 2, 3, 4, 9, 10} holds true. Since the state 9 is not a final state and the boundary flag b is set to true, the system control proceeds to the 17-th line. However, since id(9)=7 and B={7} hold true, the condition at the 17-th line is not satisfied.

Returning to the fourth line, since the priority queue S is not an empty set, the system control proceeds to the fifth line. The priority queue S includes only a single element. Hence, q=5, $q_p$=2, w=3, $w_p$=0, x=B, $x_p$=ε, b=false, and S={ } hold true. At the seventh line, P={1, 2, 3, 4, 5, 9, 10} holds true. Since the state 5 is not a final state and since the boundary flag b is set to false, the system control proceeds to the 29-th line. The state 5 has two outgoing transitions. Firstly, for the transition having the state 6 as the next state, the operations from the 30-th line to the 34-th line are performed. Since n(e)=6 holds true, the condition at the 30-th line is satisfied. Since the boundary flag b(e) is set to false, the condition at the 31-st line is not satisfied. Therefore, at the 34-th line, S={(6, 5, 4, 0, B, ε, false)} holds true. Subsequently, regarding the transition having the state 7 as the next state, the operations are performed in an identical manner. Since the boundary flag b(e) is set to true, at the 32-nd line, S={(6, 5, 4, 0, B, ε, false), (7, 5, 4, 1, B, ε, true)} holds true.

Returning to the fourth line, since the priority queue S is not an empty set, the system control proceeds to the fifth line, the element having 6 as the first value has the priority of 4+w(6)=4+6=10. Similarly, the element having 7 as the first value has the priority of 4+w(7)=4+3=7. Hence, at the fifth line; q=7, $q_p$=5, w=4, $w_p$=1, x=B, $x_p$=ε, and b=true hold true. Thus, S={(6, 5, 4, 0, B, ε, false)} holds true. At the seventh line, P={1, 2, 3, 4, 5, 7, 9, 10} holds true. Since the state 7 is not a final state and the boundary flag b is set to true, the system control proceeds to the 17-th line. Then, since id(7)=6 and B={7} hold true, the system control proceeds to the 18-th line and B={6, 7} holds true. Since the 3-tuple having 7 as the first value is not included in the set M, the system control proceeds to the 23-rd line. Subsequently, a new state is created as $q'_n$=3'. Herein, the new state $q'_n$=3' corresponds to the state 3 illustrated in FIG. 6. Since $t(q_p)$=t(5)=3 holds true; at the 24-th line, t(3')=3 holds true. At the 25-th line, Q'={1', 2', 3'} and M={(1, 1', 0), (10, 2', 2), (7, 3', 1)} hold true. At the 26-th line, a transition (1', 3', B, 3) is added to the set E'. At the 27-th line, $S_{sym}$={(10, 4, 4, 1, C), (7, 5, 4, 1, ε)} holds true.

Returning to the fourth line, since the priority queue S is not an empty set, the system control proceeds to the fifth line. At the fifth line; q=6, $q_p$=5, w=4, $w_p$=0, x=B, $x_p$=ε, and b=false hold true. Moreover, S={ } also holds true. At the seventh line, P={1, 2, 3, 4, 5, 6, 7, 9, 10} holds true. Since the state 6 is not a final state and since the boundary flag b is set to false, the system control proceeds to the 29-th line. The state 1 has only a single outgoing transition. For that transition, the operations from the 30-th line to the 34-th line are performed. Since n(e)=8 holds true, the condition at the 30-th line is satisfied. Thus, the system control proceeds to the 31-st line. Since the boundary flag b(e) is set to true; at the 32-nd line, S={(8, 6, 6, 2, B, ε, true)} holds true.

Returning to the fourth line, since the priority queue S is not an empty set, the system control proceeds to the fifth line. The priority queue S includes only a single element. Hence, q=8, $q_p$=6, w=6, $w_p$=2, x=B, $x_p$=ε, and b=true hold true. Moreover, S={ } also holds true. At the seventh line, P={1, 2, 3, 4, 5, 6, 7, 8, 9, 10} holds true. Since the state 8 is not a final state and since the boundary flag b is set to true, the system control proceeds to the 17-th line. However, since id(8)=6 and B={6, 7} hold true, the condition at the 17-th line is not satisfied.

Returning to the fourth line, since the priority queue S is an empty set, the system control proceeds to the 35-th line. Then, with the priority queue $S_{sym}$ and the set M as the return values, the system control returns to the 109-th line of the pseudo code 400 illustrated in FIG. 4. Subsequently, the priority queue $S_{sym}$ and the set M are updated. Thus, $S_{sym}$={(10, 4, 4, 1, C), (7, 5, 4, 1, ε)} holds true; and M={(1, 1', 0), (10, 2', 1), (7, 3', 1)}.

Returning to the 107-th line of the pseudo code 400 illustrated in FIG. 4, since the priority queue $S_{sym}$ is not an empty set, the system control proceeds to the 108-th line. Then, the priority is calculated from the first value and the third value. In the priority queue $S_{sym}$, the element having 10 as the first value has the priority of 4+w(10)=4+2=6 because the third value is 4. Similarly, in the priority queue $S_{sym}$, the element having 7 as the first value has the priority of 4+w(70)=4+3=7. Consequently, $q_i$=10, $q_{pi}$=4, $w_i$=1, and $x_i$=C hold true. At the 109-th line, the pseudo code 300 illustrated in FIG. 3 is called.

At the first line of the pseudo code 300 illustrated in FIG. 3, the sets B and P are initialized to empty sets. At the second line, $q'_i$=2' holds true. At the third line, a 7-tuple is added to the priority queue S. Thus, S={(10, 4, 1, 0, C, ε, false)} holds true. Since the priority queue S is not an empty set, the system control proceeds to the fifth line. Since the priority queue S includes only a single element; q=10, $q_p$=4, w=1, $w_p=0$, $x=C$, $x_p=\varepsilon$, $b=\text{false}$, and $S=\{\}$ hold true. At this stage, since $q=10$ holds true, 10 is not included in the set P.

Hence, the system control proceeds to the seventh line. At the seventh line, the state 10 is added to the set P. Thus, $P=\{10\}$ holds true. Since the state 10 is not a final state and the boundary flag b is set to false, the system control proceeds to the 29-th line. The state 2 has two outgoing transitions. Firstly, for the transition having the state 11 as the next state, the operations from the 30-th line to the 34-th line are performed. Since $n(e)=11$ holds true, the condition at the 30-th line is satisfied. Since the boundary flag $b(e)$ is set to false, the condition at the 31-st line is not satisfied. Therefore, at the 34-th line, $S=\{(11, 10, 3, 0, C, \varepsilon, \text{false})\}$ holds true. Subsequently, regarding the transition having the state 13 as the next state, the operations are performed in an identical manner. As a result, at the 34-th line, $S=\{(11, 10, 3, 0, C, \varepsilon, \text{false}), (13, 10, 2, 0, C, \varepsilon, \text{false})\}$ holds true.

Returning to the fourth line, since the priority queue S is not an empty set, the system control proceeds to the fifth line. In the priority queue S, the element having 11 as the first value has the priority of $3+w(11)=3+2=5$. Similarly, the element having 13 as the first value has the priority of $2+w(13)=2+1=3$. Hence, at the fifth line; $q=13$, $q_p=10$, $w=2$, $w_p=0$, $x=C$, $x_p=\varepsilon$, and $b=\text{false}$ hold true. Thus, $S=\{(11, 10, 3, 0, C, \varepsilon, \text{false})\}$ holds true. At the seventh line, $P=\{10, 13\}$ holds true. Since the state 13 is not a final state and the boundary flag b is set to false, the system control proceeds to the 29-th line. The state 13 has only a single outgoing transition. At the 34-th line, $S=\{(11, 10, 3, 0, C, \varepsilon, \text{false}), (14, 13, 3, 0, C, \varepsilon, \text{false})\}$ holds true.

Returning to the fourth line, since the priority queue S is not an empty set, the system control proceeds to the fifth line. In the priority queue S, the element having 11 as the first value has the priority of $3+w(11)=3+2=5$. Similarly, the element having 14 as the first value has the priority of $3+w(14)=3+0=3$. Hence, at the fifth line; $q=14$, $q_p=13$, $w=3$, $w_p=0$, $x=C$, $x_p=\varepsilon$, and $b=\text{false}$ hold true. Thus, $S=\{(11, 10, 3, 0, C, \varepsilon, \text{false})\}$ holds true. At the seventh line, $P=\{10, 13, 14\}$ holds true. Since the state 14 is a final state, the system control proceeds to the ninth line. Herein, $M=\{(1, 1', 0), (10, 2', 1), (7, 3', 1)\}$ holds true. Hence, the condition at the ninth line is not satisfied, and the system control proceeds to the 12-th line. At the 12-th line, a new state is created as $q'_n=4'$. Herein, the new state $q'_n=4'$ corresponds to the state 4 illustrated in FIG. 6. Since $t(q_p)=t(14)=7$ holds true; at the 13-th line, $t(4')=7$ holds true. At the 14-th line, $Q'=\{1', 2', 3', 4'\}$, $F'=\{4'\}$, and $M=\{(1, 1', 0), (10, 2', 1), (7, 3', 1), (14, 4', 0)\}$ hold true. At the 15-th line, a transition $(2', 4', C, 3)$ is added to the set E'.

Returning to the fourth line, since the priority queue S is not an empty set, the system control proceeds to the fifth line. The priority queue S includes only a single element. Hence, $q=11$, $q_p=10$, $w=3$, $w_p=0$, $x=C$, $x_p=\varepsilon$, and $b=\text{false}$ hold true. Moreover, $S=\{\}$ also holds true. At the seventh line, $P=\{10, 11, 13, 14\}$ holds true. Since the state 11 is not a final state and since the boundary flag b is set to false, the system control proceeds to the 29-th line. The state 11 has only a single outgoing transition. At the 34-th line, $S=\{(14, 11, 5, 0, C, \varepsilon, \text{false})\}$ holds true.

Returning to the fourth line, since the priority queue S is not an empty set, the system control proceeds to the fifth line. The priority queue S includes only a single element. Hence, $q=14$, $q_p=11$, $w=5$, $w_p=0$, $x=C$, $x_p=\varepsilon$, and $b=\text{false}$ hold true. Moreover, $S=\{\}$ also holds true. Since the set. P does not include 14, the condition at the sixth line is not satisfied.

Returning to the fourth line, since the priority queue S is an empty set, the system control proceeds to the 35-th line. Then, with the priority queue $S_{sym}$ and the set M as the return values, the system control returns to the 109-th line of the pseudo code 400 illustrated in FIG. 4. Subsequently, the priority queue $S_{sym}$ and the set M are updated. Thus, $S_{sym}=\{(7, 5, 4, 1, \varepsilon)\}$ holds true; and $M=\{(1, 1', 0), (10, 2', 1), (7, 3', 1), (14, 4', 0)\}$.

Returning to the 107-th line of the pseudo code 400 illustrated in FIG. 4, since the priority queue $S_{sym}$ is not an empty set, the system control proceeds to the 108-th line. Then, the priority is calculated from the first value and the third value. The priority queue $S_{sym}$ includes a single element. Therefore, $q_i=7$, $q_{pi}=5$, $w_i=1$, and $x_i=\varepsilon$ hold true. At the 109-th line, the pseudo code 300 illustrated in FIG. 3 is called. When the operations are carried out in the same way as explained till now, a transition $(3', 4', C, 4)$ is added to the set E'.

Returning to the 107-th line of the pseudo code 400 illustrated in FIG. 4, the priority queue $S_{sym}$ is an empty set. That marks the completion of the processing of the pseudo code 400 illustrated in FIG. 4. In this way, as illustrated in FIG. 6, the second automaton is created by eliminating redundant paths.

Meanwhile, in the example, as illustrated in FIG. 5, the appearance positions are assigned to all states in the first automaton. However, only the following appearance positions are used: the appearance positions of the initial states; the appearance positions of the final states; and the appearance positions of the previous states to the transitions assigned with a boundary flag. Accordingly, the assignment positions can be alternatively assigned only to the corresponding states. Moreover, in the example, the identifiers are assigned only to the required states. Alternatively, the identifiers can be assigned to all states.

Hardware Configuration

Figure 7:
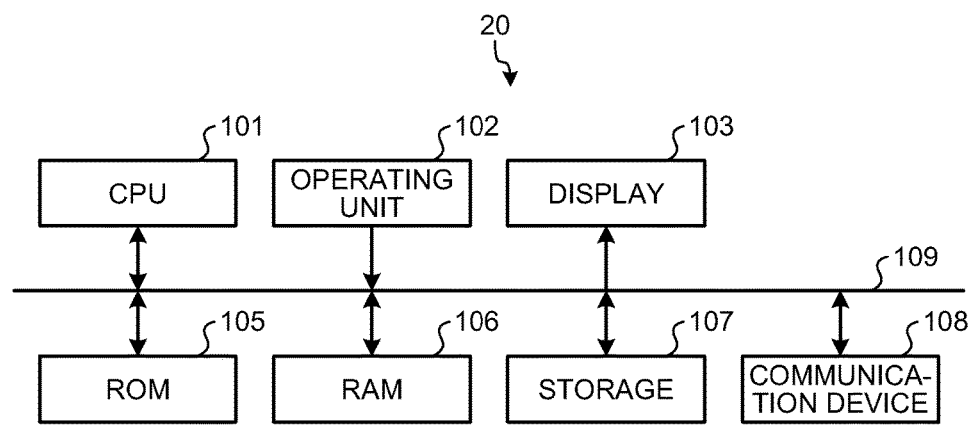
FIG. 7 is a diagram illustrating a hardware configuration of the conversion device according to the embodiment.

FIG. 7 is a hardware block diagram of the conversion device 20 according to the embodiment. The conversion device 20 includes a central processing unit (CPU) 101, an operating unit 102, a display unit 103, a read only memory (ROM) 105, a random access memory (RAM) 106, a storage 107, a communication device 108, and a bus 109 that interconnects each of these constituent elements.

The CPU 101 uses a predetermined area in the RAM 106 as the work area and performs various operations in cooperation with various computer programs stored in advance in the ROM 105 or the storage 107; and performs an overall control of the constituent elements of the conversion device 20. Moreover, in cooperation with the computer programs stored in advance in the ROM 105 or the storage 107, the CPU 101 implements the operating unit 102, the display unit 103, and the communication device 108.

The operating unit 102 is an input device such as a mouse or a keyboard that receives instruction signals in the form of information input by a user by operating the operating unit 102, and outputs the instruction signals to the CPU 101.

The display unit 103 is a display device such as a liquid crystal display (LCD). Based on display signals received from the CPU 101, the display unit 103 displays a variety of information. For example, the display unit 103 displays the input symbol strings output by the conversion device 20. In the case in which the input symbol strings are to be output to the communication device 108 or the storage 107, the conversion device 20 may not include the display unit 103.

The ROM 105 is used to store, in a non-rewritable manner, computer programs and a variety of setting information to be used in controlling the conversion device 20.

The RAM 106 is a volatile memory medium such as a synchronous dynamic random access memory (SDRAM). The RAM 106 serves as the work area of the CPU 101. More particularly, the RAM 106 functions as a buffer for temporarily storing various variables and parameters used by the conversion device 20.

The storage 107 is a rewritable storage device such as a storage made of a semiconductor such as a flash memory, or a storage medium capable of magnetic or optical recording. The storage 107 is used to store the computer programs and a variety of setting information used in controlling the conversion device 20. Moreover, the storage 107 is used to store a variety of information related to the first automaton and the second automaton. Meanwhile, the first-automaton storage 21, the best-path weight storage 23, the second-automaton storage 24, the first priority queue 26, and the second priority queue 27 of the conversion device 20 can be implemented using any one of the ROM 105, the RAM 106, and the storage 107.

The communication device 108 communicates with an external device, and is used in receiving input of and in outputting the first automaton and the second automaton. In the case of using the first automaton that is recorded in advance and outputting the second automaton to the display unit 103 or the storage 107, the conversion device 20 may not include the communication device 108.

The computer programs executed in the conversion device 20 according to the embodiment are recorded as installable or executable files in a computer-readable recording medium such as a compact disk read only memory (CD-ROM), a flexible disk (FD), a compact disk readable (CD-R), or a digital versatile disk (DVD), which may be provided as a computer program product.

Alternatively, the computer programs executed in the conversion device 20 according to the embodiment can be saved as downloadable files on a computer connected to the Internet or can be made available for distribution through a network such as the Internet. Alternatively, the computer programs executed in the conversion device 20 according to the embodiment can be stored in advance in a ROM or the like.

The computer programs executed in the conversion device 20 according to the embodiment contain a module for each of the abovementioned constituent elements (the first-automaton storage 21, the best-path weight calculator 22, the best-path weight storage 23, the second-automaton storage 24, the converter 25 (the specifying unit 41, the search unit 42, the state register 43, the transition register 44, and the appearance position register 45), the first priority queue 26, and the second priority queue 27). The CPU 101 (the processor) reads the computer programs from a memory medium and executes them so that each constituent element is loaded in a main memory device. As a result, the conversion device 20 (the first-automaton storage 21, the best-path weight calculator 22, the best-path weight storage 23, the second-automaton storage 24, the converter 25 (the specifying unit 41, the search unit 42, the state register 43, the transition register 44, and the appearance position register 45), the first priority queue 26, and the second priority queue 27) is generated in the main memory device. Meanwhile, the conversion device 20 can be configured entirely or partially using hardware.

Effect

As described above, the conversion device 20 according to the embodiment can generate the second automaton by eliminating unnecessary paths from the first automaton. For that, regarding a plurality of paths of the first automaton in which the same input symbols are assigned to the same appearance positions, the conversion device 20 combines the paths on an identifier-by-identifier basis and generates the second automaton. As a result, if the same input symbols are generated by passing different paths in the source search network (for example, if the same input symbols have passed different states of an HMM), then the conversion device 20 can assign the same input symbols to individual transitions without combining the paths.

Moreover, the conversion device 20 performs the search at each boundary in the first automaton and detects the best path. Hence, it becomes possible to generate a transition for each border as well as to assign the appearance position of each boundary in the second automaton. With that, the conversion device 20 according to the embodiment can generate the second automaton which holds the appearance positions representing the data positions, the timings, or the sequence of the occurrence of boundaries.

Modification Example

In FIG. 8 is illustrated a pseudo code 800 executed in the conversion device 20 according to a modification example.

Given below is the explanation of the conversion device 20 according to the modification example. In the first automaton (the expanded WFSA), a plurality of paths having the same identifier can be assigned with different input symbols. In this case, for each pair of an input symbol and an identifier, the search unit 42 searches for such a path in the first automaton which has the best weight from the start position to the next boundary. With that, not only the input symbols assigned to the best paths can be assigned in the second automaton, but also the input symbols assigned to the non-best paths can also be assigned in the second automaton.

In order to search for the path having the best weight for each pair of an input symbol and an identifier, changes are made to the elements stored in the sets P and B of the pseudo code 300 illustrated in FIG. 3. More particularly, the set P is used to store elements in the form of 2-tuples of the states and the input symbol strings. The set B is used to store elements in the form of 2-tuples of the identifiers and the input symbol strings.

Moreover, changes are made to the sixth line, the seventh line, the 17-th line, the 18-th line, the 27-th line, and the 30-th line of the pseudo code 300 illustrated in FIG. 3. The following explanation is given about the differences in the pseudo codes. In the following explanation of the modification example; unless otherwise specified, the line numbers belong to the changed pseudo code 800 illustrated in FIG. 8.

At the sixth line, the conversion device 20 determines whether or not a 2-tuple $(q, x \cdot x_p)$ is included in the set P. If the 2-tuple $(q, x \cdot x_p)$ is not included in the set P, then the conversion device 20 performs the operations from the seventh line to the 35-th line. On the other hand, if the 2-tuple $(q, x \cdot x_p)$ is included in the set P, then the conversion device 20 returns to the operation at the fourth line.

At the seventh line, the conversion device 20 adds the 2-tuple $(q, x \cdot x_p)$ in the set P.

At the 17-th line, the conversion device 20 determines whether or not a 2-tuple $(id(q), x \cdot x_p)$ is included in the set B. If the 2-tuple $(id(q), x \cdot x_p)$ is not included in the set B, then the conversion device 20 performs the operations from the 18-th line to the 28-th line. On the other hand, when the 2-tuple $(id(q), x \cdot x_p)$ is included in the set B, then the conversion device 20 returns to the operation at the fourth line.

At the 20-th line, the conversion device 20 adds the 2-tuple (id(q), x·$x_p$) in the set B.

Herein, the 27-th line of the pseudo code 300 illustrated in FIG. 3 is divided into two lines, namely, the 18-th line and the 19-th line illustrated in FIG. 8. At the 18-th line, the conversion device 20 determines whether or not the 2-tuple having id(q) as the first value is included in the set B. If the 2-tuple having id(q) as the first value is included in the set B, the conversion device 20 performs the operation at the 19-th line. However, if the 2-tuple having id(q) as the first value is not included in the set B, then the conversion device 20 does not perform any operation. At the 19-th line, an identical operation to the operation at the original 27-th line is performed. That is, at the 19-th line of the pseudo code 800 illustrated in FIG. 8, the conversion device 20 adds a new 5-tuple (q, $q_p$, w, $w_p$, $x_p$) in the priority queue $S_{sym}$. Thus, the conversion device 20 performs the operation at the 20-th line only in the case in which the input symbol string is not taken into account and the identifiers are not included in the set B.

At the 31-st line, the conversion device 20 determines whether a 2-tuple (n(e), x·i(e)) is included in the set P. If the 2-tuple (n(e), x·i(e)) is not included in the set P, then the conversion device 20 performs the operations from the 32-nd line to the 35-th line. On the other hand, if the 2-tuple (n(e), x·i(e)) is included in the set P, then the conversion device 20 performs the operations from the 31-st line to the 35-th line for the subsequent transition e. Herein, the operation at the 31-st line can be skipped.

As a result of performing such operations, the conversion device 20 not only can assign the input symbols assigned to the best paths in the second automaton, but also can assign the input symbols assigned to the non-best paths in the second automaton.

Pattern Recognition Device

Figure 9:
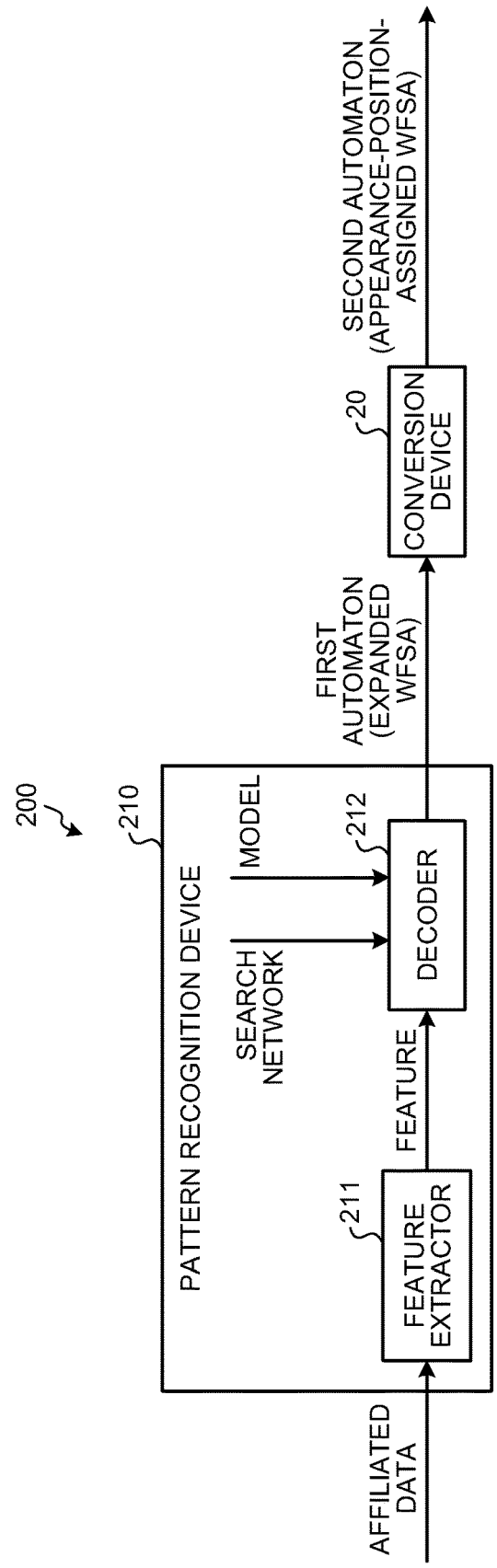
FIG. 9 is a diagram illustrating a configuration of a pattern recognition system according to the embodiment.

In FIG. 9 is illustrated a configuration of a pattern recognition system 200 according to the embodiment. Thus, given below is the explanation of the pattern recognition system 200 according to the embodiment.

The pattern recognition system 200 recognizes the pattern of sequential data that has been input, and outputs the recognition result in a second automaton (an appearance-position-assigned WFSA). Herein, the pattern recognition system 200 either can detect a single symbol string in the best path of the second automaton and present the detected symbol string to the user, or can detect N number of symbol strings up to the N-th best path (where N is an integer equal to or greater than two) and present the detected symbol strings to the user.

The pattern recognition system 200 includes a pattern recognition device 210 and the conversion device 20. The pattern recognition device 210 receives input of sequential data and recognizes the pattern, and outputs a first automaton (an expanded WFSA). The conversion device 20 converts the first automaton, which has been output by the pattern recognition device 210, into a second automaton. Herein, the conversion device 20 is the device explained with reference to FIGS. 1 to 8. Hence, the detailed explanation of the conversion device 20 is not repeated.

Regarding the sequential data input to the pattern recognition system 200; as long the sequential data represents patterns, any type of sequential data can be used. Examples of the sequential data include audio data, data representing handwriting, image data representing characters, or moving-image data representing gestures such as the sign language.

The pattern recognition device 210 includes a feature extractor 211 and a decoder 212.

The feature extractor 211 receives input of sequential data representing a pattern, and obtains the feature of the sequential data at regular time intervals. Then, the feature extractor 211 sends the obtained feature of the sequential data to the decoder 212. There are times when the feature is made of a plurality of values. In such a case, the group of a plurality of features is called a feature vector.

The feature represents information indicating the section-by-section features of the sequential data, and is used by the decoder 212 in calculating a score. When an audio signal is received as input, the feature extractor 211 obtains the feature in, for example, the units of 10 milliseconds (on a frame-by-frame basis).

Every time the feature is input from the feature extractor 211, the decoder 212 performs pattern recognition and outputs the recognition result as a first automaton (an expanded WFSA). In this case, the decoder 212 performs pattern recognition using a search network (for example, a weighted finite state transducer (WFST)) in which the model of the sequential data (whether an HMM, or a Gaussian mixture model, or a neural network) and the linkage between models is recorded.

For example, if the pattern recognition device 200 is a speech recognition device, then the sequential data represents speech data. The model represents, for example, data obtained by modeling speech in the form of syllables, phonemes, or smaller units than phonemes. In the case of using a model representing phonemes, the decoder 212 can make use of that model and obtain the phonemes which correspond to the input speech the most. When a decoder uses a weighted finite state transducer (WFST), the search network is the WFST. A WFST may include a sequence of models representing phonemes, a sequence of phonemes corresponding to words, and a probability model of a sequence of words. When the words serve as the unit of recognition, the first automaton becomes a word lattice.

Meanwhile, if the pattern recognition system 200 is an OCR device, the row extracted from the image to be recognized serves as the sequential data. Since the English language is read from the left side to the right side, image data having rows sliced in the vertical direction is input in order from the left side to the right side to the pattern recognition system 200. If the pattern recognition system 200 is a handwritten-character recognition device, then the handwriting serves as the sequential data. If the pattern recognition system 200 is an OCR device or a handwritten-character recognition device, then the unit of recognition is, for example, words or characters. Other than that, the details are identical to a speech recognition device.

Given below is the explanation about the case in which the decoder 212 outputs an expanded WFSA having boundary flags, appearance positions, and identifiers assigned therein. For example, as described in D. Povey, et al., "GENERATING EXACT LATTICES IN THE WFST FRAMEWORK", Proceedings of the International Conference on Acoustics, Speech, and Signal Processing (ICASSP '12), 2012, pp. 4213-4216 (hereinafter, Non-patent Literature 1) and A. Serralheiro, et al., "Towards a Repository of Digital Talking Books", EUROSPEECH, 2003, pp. 1605-1608 (hereinafter, Non-patent Literature 2), as a result of using the conventional technology, the decoder 212 can output the appearance positions of words, characters, phonemes, or states of an HMM. That is, the decoder 212 can output positions of the input sequential data corresponding to words, characters, phonemes, or states of an HMM. Thus, the decoder 212 can embed the appearance positions in the expanded WFSA to be output. Moreover, as described in Non-patent Literature 2, the decoder 212 can detect the boundaries between the input symbols of an expanded WFSA. For example, if the input symbols are in the form of words, then the decoder 212 can detect the boundary between two words. Consequently, the decoder 212 can embed boundary flags in the expanded WFSA. Furthermore, using the technology described in Non-patent Literature 1, the decoder 212 can output an HMM state lattice.

While searching a search network (for example, a WFST), the decoder 212 creates paths of the HMM state lattice that correspond to the best paths. As a result, it becomes possible for the decoder 212 to record which state of the HMM state lattice is created after passing which state of the WFST. Thus, for example, the decoder 212 can assign the states of the WFST, which correspond to the states of the HMM state lattice, as identifiers. That is, in this case, the identifiers represent numbers indicating the states of the WFST, and each state of the HMM state lattice is assigned with an identifier. Moreover, in an identical manner to recording the states, it is also possible for the decoder 212 to record which state of the HMM state lattice is created after passing which transition of the WFST. Hence, as the identifiers, the decoder 212 can use the transitions of the WFST instead of the states. In this way, the decoder 212 can assign boundary flags, appearance positions, and identifiers in the HMM state lattice.

During the operation of finding out the paths having suitable weights from among the paths included in a model, the decoder 212 calculates the weight of a path from the starting state of operations to each state. If the decoder 212 is configured to generate a WFSA in which the starting state of operations of the decoder 212 is treated as a final state and in which the state at which the operations of the decoder 212 are completed is treated as an initial state; then the conversion device 20 can obtain the weight of the best path from each state to the final state without having to perform separate calculation. That is because of the fact that the decoder 212 has already calculated the weight of the best path from the starting state of operations to each state. In this case, the transitions in the WFSA input to the conversion device 20 have the opposite orientation to the order of the feature that is input to the decoder 212. That is, corresponding to an input symbol corresponding to the feature input at a later stage, a transition closer to an initial state of the WFSA is assigned. Thus, the conversion device 20 can be configured in such a way that, immediately before outputting the input symbol strings, the sequence of the input symbol strings is reversed.

Flow of Operations

FIG. 10 is a flowchart for explaining a sequence of operations performed in the pattern recognition system 200 according to the embodiment.

Firstly, as the input of sequential data starts, the pattern recognition device 200 obtains the sequential data (Step S101). Then, the feature extractor 211 extracts the feature from the sequential data and sends the feature to the decoder 212 (Step S102).

Subsequently, using a search network and a model, the decoder 212 generates a first automaton (an expanded WFSA) corresponding to the feature of the sequential data that has been input (Step S103). Then, the conversion device 20 converts the first automaton into a second automaton (an appearance-position-assigned WFSA) (Step S104). Subsequently, the conversion device 20 outputs the second automaton (Step S105).

Herein, the pattern recognition system 200 is implemented using an identical hardware configuration to the configuration illustrated in FIG. 7. Alternatively, the pattern recognition system 200 can have an identical hardware configuration to the configuration illustrated in FIG. 7 by executing computer programs. Herein, the computer programs executed in the pattern recognition device 200 contain a pattern recognition module (a feature extracting module and a decoder module) and a conversion module. The CPU 101 (the processor) reads the computer programs from a storage medium and executes them so that the constituent elements are loaded in a main storage device. As a result, the pattern recognition system 200 (the pattern recognition device 210 and the conversion device 20) is generated in the main memory device. Meanwhile, the pattern recognition system 200 can be configured entirely or partially using hardware.

In this way, the pattern recognition system 200 according to the embodiment can recognize the pattern of sequential data and generate a WFSA that does not include unnecessary paths and that has appearance positions assigned therein. As a result, the pattern recognition system 200 enables achieving reduction in the amount of calculation during the operation of generating symbol strings from the WFSA for the purpose of presentation to the user.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A conversion device comprising:
   first automaton storage configured to store therein a first automaton, the first automaton being a weighted finite state automaton in which a boundary of a path assigned with an input symbol, an appearance position of the boundary, and identifiers for identifying paths which are mergeable are assigned, the first automaton being generated by performing pattern recognition using a search network, each of the identifiers representing information for identifying a state in the search network;
   second automaton storage configured to store therein a second automaton, the second automaton being a weighted finite state automaton;
   first queue storage; and
   a processing circuit configured to:
      when a single state in the first automaton is specified as a start position, search for a sectional optimum path for each of the identifiers from one or more paths included in a target section from the start position to a next boundary in the first automaton;
      for each of the identifiers, when a search has reached the next boundary,
         on a condition that a state corresponding to a state of a head of the sectional optimum path is not registered in the second automaton, register a new state corresponding to the state of the head in the second automaton;
         when the new state is registered in the second automaton, assign the appearance position that has been assigned to the state of the head, to the new state;

register, in the second automaton, a new transition between a state in the second automaton corresponding to the start position and a state in the second automaton corresponding to the state of the head;

cause the first queue storage to store therein a first state that is the state of the head;

when searches for the one or more paths included in the target section are all completed, obtain one of first states from the first queue storage; and specify the obtained first state as a new start position; and when the new start position is specified, search for the sectional optimum path for each of the identifiers from one or more paths included in a new target section from the specified new start position to a next boundary, wherein the sectional optimum path represents a path for which a weight becomes optimum, the weight being obtained by adding a weight from the start position to the next boundary and an optimum-path weight, the optimum-path weight represents a weigh of one or more paths from the next boundary to a final state that becomes optimum, and the weight becoming optimum represents that the weight becomes a smallest value or a greatest value.

2. The device according to claim 1, wherein the processing circuit is further configured to obtain, from the first queue storage, one of the first states having a combined weight that is optimum, wherein the combined weight is obtained by adding an accumulated weight from an initial state to the first state in the first automaton and a weight of an optimum path from the first state to a final state.

3. The device according to claim 1, wherein the processing circuit is configured to register, in the second automaton, the new transition assigned with an input symbol string where the input symbol assigned to the retrieved path is concatenated.

4. The device according to claim 3, wherein the input symbol string includes input symbols that is concatenated in order of a transition from the start position to the state of the head in the retrieved path.

5. The device according to claim 2, wherein the processing circuit is configured to, at the start of a search, specify an initial state in the first automaton as the start position; and register, in the second automaton, a new initial state corresponding to the initial state in the first automaton.

6. The device according to claim 5, wherein the processing circuit is configured to, when a search has reached the final state, register, in the second automaton, a new final state corresponding to the first state.

7. The device according to claim 2, wherein the first queue storage stores first elements containing the first state and the accumulated weight from the initial state to the first state, and outputs the first elements in order from a first element having the combined weight that is optimum wherein the processing circuit is configured to:

obtain one of the first elements from the first queue storage, and specify the first state included in the obtained first element as the new start position.

8. The device according to claim 7, further comprising second queue storage configured to store second elements containing a state being searching and a path weight from the start position to the state being searching, and output the second elements in order from a second element having a second weight that is optimum, the second weight being a value that is obtained by adding the path weight and a weight of an optimum path from the state being searching to the final state, wherein the processing circuit is configured to, when a path is searched for which a weight from the specified start position to the next boundary in the first automaton is optimum, obtain one of the second elements from the second queue storage, and for each of one or more outgoing transitions from the state being searching included in the obtained second element, generate a new second element in which a next state is the state being searching, and repeat writing of the generated new second element in the second queue storage until reaching the next boundary.

9. The device according to claim 1, wherein the processing circuit is configured to, for each pair of the input symbol and an identifier, search for the sectional optimum from the one or more paths included in the target section in the first automaton, and for each pair of the input symbol and the identifier, register the new transition in the second automaton, and assign the input symbol that has been assigned to the first automaton, to the new transition.

10. A pattern recognition system comprising:

a pattern recognition device configured to receive input of sequential data, perform pattern recognition with respect to the sequential data using a search network, and generate the first automaton; and the conversion device according to claim 1 to convert the first automaton, which is generated by the pattern recognition device, into the second automaton.

11. The system according to claim 10, wherein the appearance position indicates a corresponding position in the sequential data that is input to the pattern recognition device.

12. A conversion method implemented in a conversion device, the method comprising:

storing by the conversion device comprising:

first automaton storage configured to store therein a first automaton that is a weighted finite state automaton in which a boundary of a path assigned with an input symbol, an appearance position of the boundary, and identifiers for identifying paths which are mergeable are assigned, the first automaton being generated by performing pattern recognition using a search network, each of the identifiers representing information for identifying a state in the search network;

second automaton storage configured to store therein a second automaton that is a weighted finite state automaton; and first queue storage;

when a single state in the first automaton is specified as a start position, searching for a sectional optimum path for each of the identifiers from one or more paths included in a target section from the start position to a next boundary in the first automaton;

for each of the identifiers, when a search has reached the next boundary, on a condition that a state corresponding to a state of a head of the sectional optimum path is not registered in the second automaton, registering a new state corresponding to the state of the head in the second automaton;

when the new state is registered in the second automaton, assigning the appearance position that has been assigned to the state of the head, to the new state;

registering, in the second automaton, a new transition between a state in the second automaton corresponding to the start position and a state in the second automaton corresponding to the state of the head;

causing the first queue storage to store therein a first state that is the state of the head;

when searches for the one or more paths included in the target section are all completed, obtaining one of first states from the first queue storage; and specifying the obtained first state as a new start position; and when the new start position is specified, searching for the sectional optimum path for each of the identifiers from one or more paths included in a new target section from the specified new start position to a next boundary, wherein the sectional optimum path represents a path for which a weight becomes optimum, the weight being obtained by adding a weight from the start position to the next boundary and an optimum-path weight, the optimum-path weight represents a weigh of one or more paths from the next boundary to a final state that becomes optimum, and the weight becoming optimum represents that the weight becomes a smallest value or a greatest value.

13. A computer program product comprising a non-transitory computer-readable medium containing a program executed by a computer, the program causing the computer to execute:

storing, wherein the computer comprises:

first automaton storage configured to store therein a first automaton that is a weighted finite state automaton in which a boundary of a path assigned with an input symbol, an appearance position of the boundary, and identifiers for identifying paths which are mergeable are assigned, the first automaton being generated by performing pattern recognition using a search network, each of the identifiers representing information for identifying a state in the search network;

second automaton storage configured to store therein a second automaton that is a weighted finite state automaton; and first queue storage;

when a single state in the first automaton is specified as a start position, searching for a sectional optimum path for each of the identifiers from one or more paths included in a target section from the start position to a next boundary in the first automaton;

for each of the identifiers, when a search has reached the next boundary, on a condition that a state corresponding to a state of a head of the sectional optimum path is not registered in the second automaton, registering a new state corresponding to the state of the head in the second automaton;

when the new state is registered in the second automaton, assigning the appearance position that has been assigned to the state of the head, to the new state;

registering, in the second automaton, a new transition between a state in the second automaton corresponding to the start position and a state in the second automaton corresponding to the state of the head;

causing the first queue storage to store therein a first state that is the state of the head;

when searches for the one or more paths included in the target section are all completed, obtaining one of first states from the first queue storage; and specifying the obtained first state as a new start position; and when the new start position is specified, searching for the sectional optimum path for each of the identifiers from one or more paths included in a new target section from the specified new start position to a next boundary, wherein the sectional optimum path represents a path for which a weight becomes optimum, the weight being obtained by adding a weight from the start position to the next boundary and an optimum-path weight, the optimum-path weight represents a weigh of one or more paths from the next boundary to a final state that becomes optimum, and the weight becoming optimum represents that the weight becomes a smallest value or a greatest value.

* * * * *